United States Patent
Tan

(10) Patent No.: US 10,492,119 B2
(45) Date of Patent: *Nov. 26, 2019

(54) NEXT GENERATION INTELLIGENT MESH NETWORK WITH FRONTHAUL AND BACKHAUL SERVICES

(71) Applicant: Verizon Patent and Licensing Inc., Arlington, VA (US)

(72) Inventor: Thomas H. Tan, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/284,048

(22) Filed: Feb. 25, 2019

(65) Prior Publication Data

US 2019/0191354 A1    Jun. 20, 2019

Related U.S. Application Data

(63) Continuation of application No. 15/242,702, filed on Aug. 22, 2016, now Pat. No. 10,264,507.

(51) Int. Cl.
*H04W 40/12* (2009.01)
*H04L 12/24* (2006.01)
(Continued)

(52) U.S. Cl.
CPC ............ *H04W 40/12* (2013.01); *H04L 41/12* (2013.01); *H04L 45/24* (2013.01);
(Continued)

(58) Field of Classification Search
CPC . H04W 76/10; H04W 28/0236; H04W 8/005; H04W 84/18; H04W 40/205;
(Continued)

(56) References Cited

U.S. PATENT DOCUMENTS 9,225,652 B2 * 12/2015 Li ........................ H04L 47/18
10,264,507 B2 * 4/2019 Tan ...................... H04W 40/12
(Continued)

FOREIGN PATENT DOCUMENTS

WO       2017/070635       4/2017

OTHER PUBLICATIONS

"Mesh Networking", Wikipedia, Apr. 30, 2018, pp. 1-2, https://en.wikipedia.org/wiki/Mesh_networking.
(Continued)

*Primary Examiner* — Maharishi V Khirodhar
*Assistant Examiner* — Kenneth P Hunt

(57) ABSTRACT

A method, a device, and a non-transitory storage medium provide to establish a link with a wireless station of a wireless access network that is one of a next generation partial mesh network or a next generation full mesh network; receive current control information pertaining to one or multiple second links of a data plane for end user traffic that are between the wireless station and one or multiple wireless stations, the current control information including link information, service performance information, or traffic flow information; analyze the current control information; determine whether the one or multiple second links should be changed; change one or more of the one or more multiple second links when determining that the one or multiple second links should be changed; and transmit, to the wireless station, routing and forwarding information that indicates the one or more of the one or more multiple second links.

20 Claims, 18 Drawing Sheets

(51) Int. Cl.
*H04L 12/707* (2013.01)
*H04W 28/02* (2009.01)
*H04W 76/10* (2018.01)
*H04W 40/24* (2009.01)
*H04W 8/00* (2009.01)
*H04W 84/18* (2009.01)
*H04L 12/26* (2006.01)
*H04L 12/715* (2013.01)

(52) U.S. Cl.
CPC ..... *H04W 28/0236* (2013.01); *H04W 40/248* (2013.01); *H04W 76/10* (2018.02); *H04L 41/5009* (2013.01); *H04L 43/08* (2013.01); *H04L 45/64* (2013.01); *H04W 8/005* (2013.01); *H04W 40/246* (2013.01); *H04W 84/18* (2013.01)

(58) Field of Classification Search
CPC ............. H04W 40/242; H04W 40/246; H04W 40/248; H04W 40/34; H04W 40/02–22; H04W 40/24–32; H04W 40/12; H04L 41/12; H04L 43/08; H04L 41/5009; H04L 45/02; H04L 45/12–1287
USPC ........................................................ 370/254
See application file for complete search history.

(56) References Cited

U.S. PATENT DOCUMENTS

| | | |
|---|---|---|
| 2007/0201411 A1 | 8/2007 | Behroozi |
| 2008/0181133 A1 | 7/2008 | Thubert et al. |
| 2008/0304485 A1* | 12/2008 | Sinha ..................... H04L 12/66 370/392 |
| 2010/0124196 A1 | 5/2010 | Bonar et al. |
| 2013/0010646 A1* | 1/2013 | Liu ......................... H04W 4/70 370/255 |
| 2014/0056209 A1* | 2/2014 | Park ..................... H04W 16/26 370/315 |
| 2016/0029403 A1* | 1/2016 | Roy .................. H04W 72/0406 370/336 |
| 2017/0164263 A1* | 6/2017 | Lindoff ................. H04W 40/12 |
| 2018/0102961 A1 | 4/2018 | Emmanuel et al. |
| 2018/0103505 A1 | 4/2018 | Amini et al. |
| 2018/0124859 A1 | 5/2018 | Cho et al. |

OTHER PUBLICATIONS

"Network Topology", Wikipedia, Jun. 24, 2018, pp. 2 and 8-10, https://en.wikipedia.org/wiki/Network_topology.

* cited by examiner

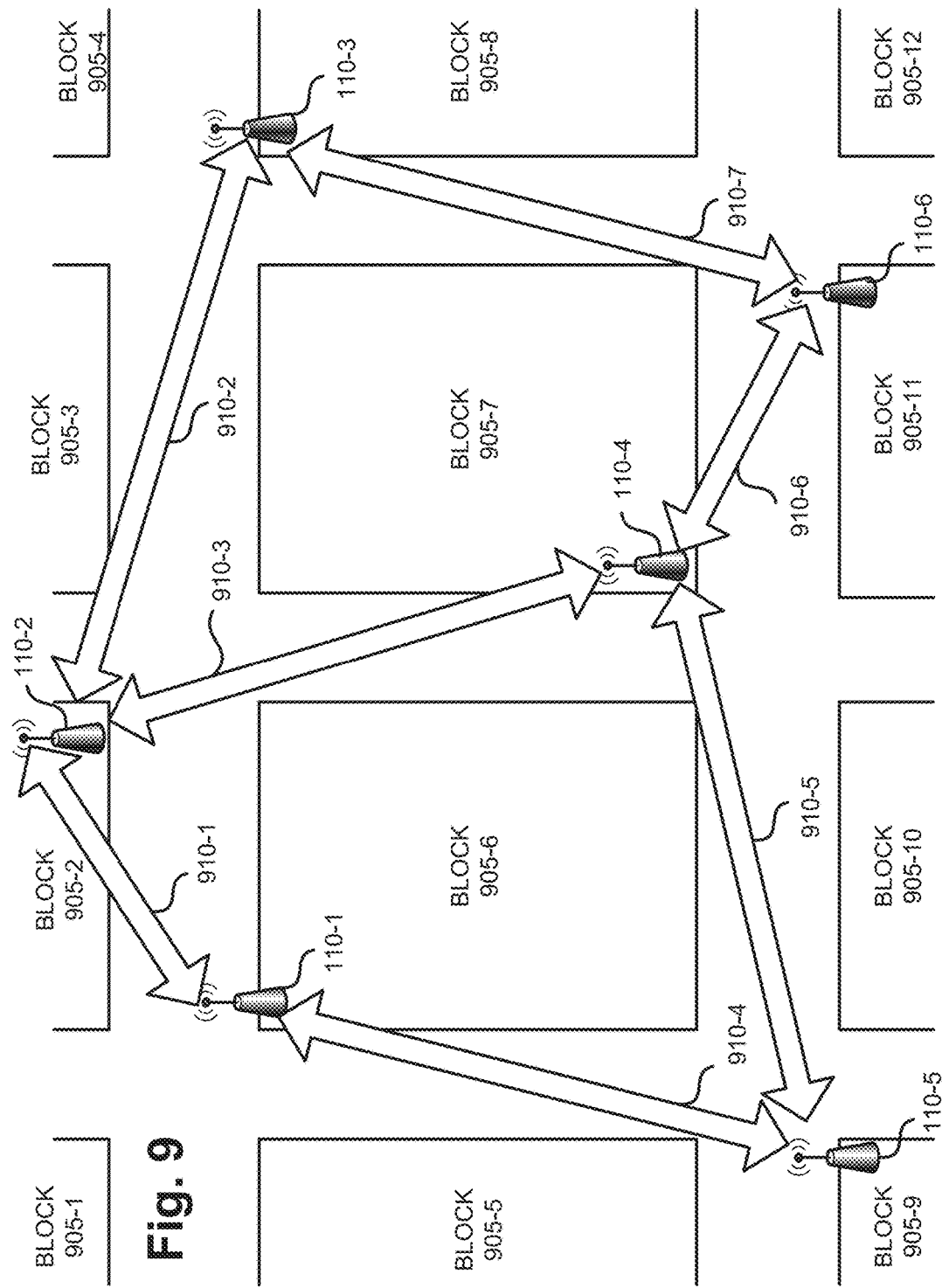

NEXT GENERATION INTELLIGENT MESH NETWORK WITH FRONTHAUL AND BACKHAUL SERVICES

CROSS-REFERENCE TO RELATED APPLICATION

This application is a continuation of U.S. patent application Ser. No. 15/242,702 filed on Aug. 22, 2016, the contents of which are incorporated herein by reference.

BACKGROUND

Fifth Generation (5G) wireless technology is under development. Since it is the aim of any next generation technology to surpass the performance of the existing generation, various architectures are being discussed, such as software-defined networking (SDN), network functions virtualization (NFV), and network virtualization, which are designed to improve various parameters, such as traffic capacity, latency, data throughput, etc.

BRIEF DESCRIPTION OF THE DRAWINGS

FIG. 9 is a diagram illustrating an exemplary locale at which the wireless mesh network depicted in FIG. 1 may be deployed.

DETAILED DESCRIPTION OF PREFERRED EMBODIMENTS

Figure 1:
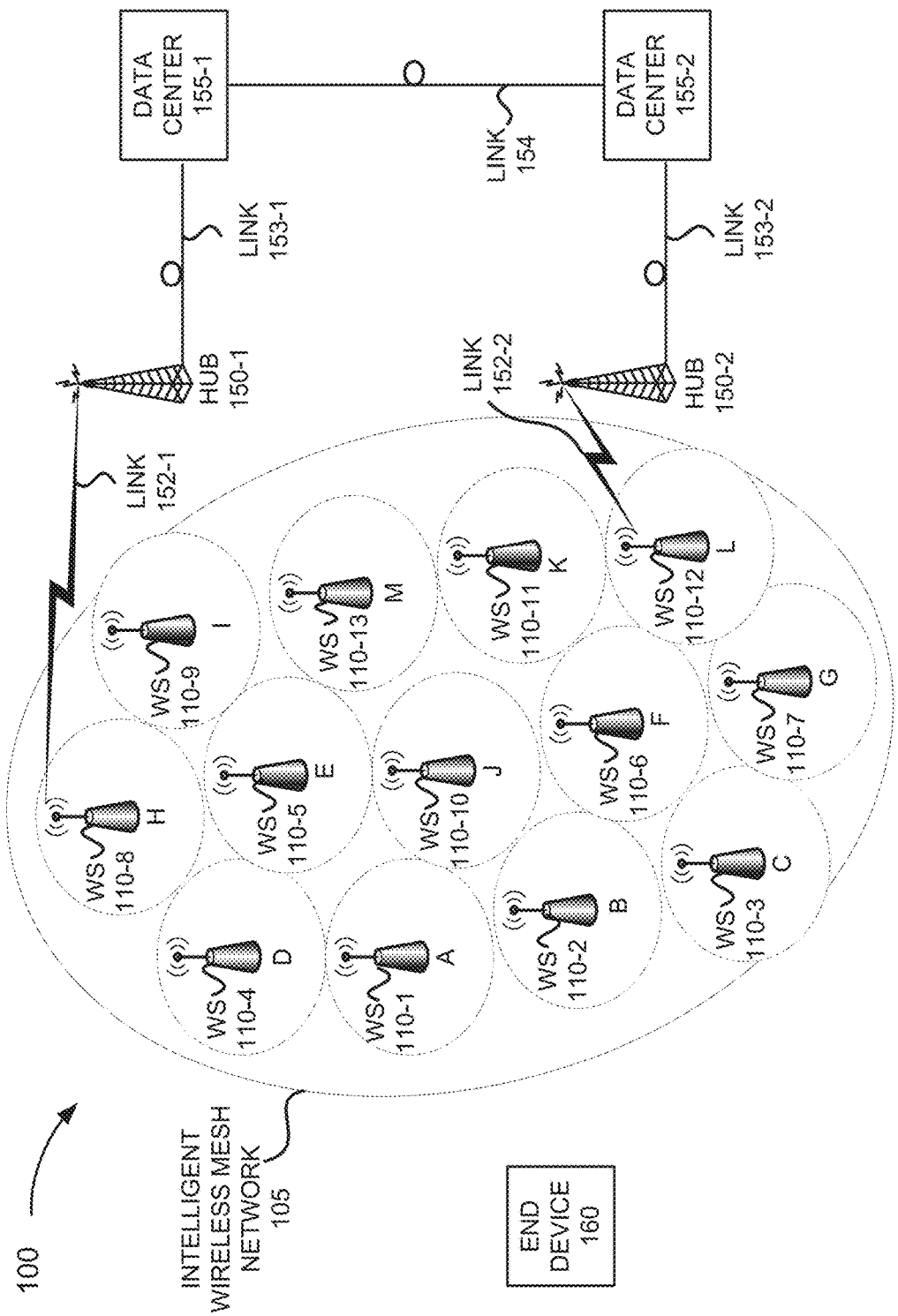
FIG. 1 is a diagram illustrating an exemplary environment in which an exemplary embodiment of next generation fronthaul and backhaul services may be implemented.

The following detailed description refers to the accompanying drawings. The same reference numbers in different drawings may identify the same or similar elements. Also, the following detailed description does not limit the invention.

Since the number of devices and correspondingly the amount of traffic is expected to grow at dramatic rates in the years to come, next generation technology, such as 5G technology will be expected to satisfy various performance, network management, and cost issues for network operators. As used herein, the term 5G is referring to an advanced or next generation wireless network and is not intended to limit the disclosed embodiments to any specific standard or evolution of advanced wireless networks.

One approach for a next generation network, such as, for example, a 5G network, is the deployment of a heterogeneous network (HetNet) that includes different layers of cells. For example, the HetNet may include macro cells and small cells. Deployment of small cells to support 5G technology is recognized as a solution to provide capacity and coverage, particularly in geographic areas where service cannot be supported using a macro cell architecture, such as in urban areas, indoor environments, etc. However, one issue is backhaul connectivity from small cells to a macro cell or other backend system.

Exemplary embodiments may be directed to a next generation network. The phrase "next generation" may refer to a future generation wireless network and/or standard. The next generation network may include backward capabilities toward a previous generation and/or standard. According to an exemplary embodiment, an intelligent wireless mesh network (IWMN) for next generation fronthaul and backhaul connectivity is provided. According to an exemplary embodiment, the intelligent wireless mesh network includes smart wireless stations that each services a small cell. According to an exemplary embodiment, each smart wireless station includes logic that provides a 5G fronthaul service and a 5G backhaul connection service, as described herein. The 5G fronthaul service includes a discovery and neighbor selection service and a multi-active multi-path service, as described herein. The 5G backhaul connectivity service includes a reporting service and a backhaul control service. These services support the selection of optimal routes and subsequent routing of traffic from an end device to a macro cell or other backend system or network based on the state of the intelligent wireless mesh network. According to an exemplary implementation, multiple paths may be selected and used in the intelligent wireless mesh network to provide multiple active flows of traffic for a session between the end device and the backend system. In this way, redundancy, reliability, and throughput may be maximized. The intelligent wireless mesh network may support virtual configurations of various topologies, such as a ring, daisy-chain, tree, star, or other type of topology, when routing the traffic.

According to an exemplary embodiment, the smart wireless station includes a smart antenna. According to an exemplary implementation, the smart antenna provides 360 degree coverage. According to other exemplary implementations, the smart antenna provides coverage in any range between 0 and 360 degrees (e.g., 270 degrees, 180 degrees, 120 degrees, 90 degrees, etc.). The intelligent wireless mesh network may use protocols that support various architectures, such as virtual radio access network (vRAN), SDN, and/or NFV.

According to an exemplary embodiment, the smart wireless station may communicate within a frequency spectrum between about 28 Gigahertz (GHz) and about 60 GHz. According to other exemplary embodiments, the smart wireless station may communicate within a different frequency spectrum, such as somewhere between about 1 GHz and about 100 GHz. According to an exemplary embodiment, the intelligent wireless mesh network-to-fiber may communicate within the spectrum between about 70 GHz and about 90 GHz. According to an exemplary implementation, the smart wireless station uses a directional antenna to connect to a hub system. According to other exemplary embodiments, the intelligent wireless mesh network-to-fiber may communicate within a different spectrum.

In view of the foregoing, next generation fronthaul and backhaul services are provided that afford optimal multi-active flows of traffic in support of an end device session.

FIG. 1 is a diagram illustrating an exemplary environment 100 in which an exemplary embodiment of intelligent next generation fronthaul and backhaul services may be implemented. As illustrated, environment 100 includes intelligent wireless mesh network 105. Intelligent wireless mesh network 105 includes wireless stations 110-1 through 110-13 (also referred to collectively as wireless stations 110 and, individually or generally as wireless station 110). Environment 100 further includes hubs 150-1 and 150-2 (also referred to collectively as hubs 150 and, individually or generally as hub 150) and data centers 155-1 and 155-2 (also referred to collectively as data centers 155 and, individually or generally as data center 155). Environment 100 also includes an end device 160.

Environment 100 includes links between intelligent wireless mesh network 105 and hubs 150. For example, environment 100 includes links 152-1 and 152-2 between wireless station 110 and hub 150. Environment 100 also includes links between hubs 150 and data centers 155 as well as links between data centers 155. For example, environment 100 includes links 153-1 and 153-2 between hubs 150 and data centers 155 and link 154 between data centers 155. Environment 100 may be implemented to include wired, optical, and/or wireless links among the devices and the network illustrated. A communicative connection via a link may be direct or indirect. For example, an indirect communicative connection may involve an intermediary device and/or an intermediary network not illustrated in FIG. 1. For example, environment 100 may include a relay node (RN) or other type of wireless node (e.g., a home evolved Node B (HeNB), a donor eNB (DeNB), a remote radio head (RRH), a gateway, etc.). Additionally, or alternatively, environment 100 may include an intermediary network, such as a WiFi network, a Bluetooth network, or other type of capillary network. The number and the arrangement of links illustrated in environment 100 are exemplary.

A device may be implemented according to a centralized computing architecture, a distributed computing architecture, or a cloud computing architecture (e.g., an elastic cloud, a private cloud, a public cloud, etc.). Additionally, a device may be implemented according to one or multiple network architectures (e.g., a client device, a server device, a peer device, a proxy device, and/or a cloud device).

The number of devices, the number of networks, and the configuration in environment 100 are exemplary. According to other embodiments, environment 100 may include additional devices, fewer devices, and/or differently arranged devices, than those illustrated in FIG. 1. For example, the number of wireless stations 110, hubs 150, and data centers 155 are exemplary. Additionally, or alternatively, environment 100 may include, for example, an additional network and/or differently arranged networks, than those illustrated in FIG. 1. For example, environment 100 may include a core network, the Internet, the Web, an Internet Protocol Multimedia Subsystem (IMS) network, a Rich Communication Service (RCS) network, a cloud network, or other type of network that may provide an asset (e.g., multimedia, audio and/or video, etc.), an end user service, etc.

While exemplary embodiments provided in this description are described based on the use of a particular spectrum, type of link (optical, wireless, etc.), or other characteristic, such embodiments may also support other technologies not specifically described. For example, wireless station 110, hub 150, and/or data center 155 may support legacy technologies (e.g., Fourth Generation (4G), Third Generation (3G), etc.), Ethernet, Wi-Fi, WiMax, etc., or other wireless technologies (e.g., Bluetooth, IEEE 802.15, etc). Additionally, for example, wireless station 110, hub 150, and/or data center 155 may support currently developing or future technologies, frameworks, specifications, architectures, and/or platforms, such as SDN, NFV, OpenFlow, OpenDaylight, OpenStack, cloud computing, cloud radio access network (CRAN), fog computing, or other next generation-related technologies.

Intelligent wireless mesh network 105 includes a next generation wireless network. For example, intelligent wireless mesh network 105 includes a 5G wireless network. Intelligent wireless mesh network 105 may be implemented as an indoor network, an outdoor network, an outdoor-to-indoor network, or some combination thereof. Intelligent wireless mesh network 105 may be implemented as a local area network (LAN), a metropolitan area network (MAN), a wide area network (WAN), or other type of terrestrial network. Intelligent wireless mesh network 105 provides a 5G fronthaul service and a 5G backhaul connection service. Wireless stations 110 of intelligent wireless mesh network 105 may be geographically arranged to allow for line of sight between two or more wireless stations 110. Additionally, or alternatively, wireless stations 110 of intelligent wireless mesh network 105 may be geographically arranged such that a non-line of sight exists between two or more wireless stations 110. Intelligent wireless mesh network 105 may be implemented as a full mesh network or a partial mesh network.

Wireless station 110 includes a network device that has computational and wireless communicative capabilities. According to an exemplary embodiment, wireless station 110 communicates within a spectrum between about 28 GHz and about 60 GHz. According to other exemplary embodiments, wireless station 110 communicates within a different spectrum, such as somewhere between about 1 GHz and about 100 GHz. Wireless station 110 may be implemented to include a radio remote unit (RRU). For example, the radio remote unit may include radio circuitry that couples to an antenna to receive a radio frequency signal from the antenna and radio circuitry that couples to the antenna to transmit a radio frequency signal to the antenna. By way of example, the radio circuitry may include various elements, such as an oscillator, a filter, an amplifier, a converter (e.g., analog-to-digital, digital-to-analog), a clock, transmitter circuitry, receiver circuitry, an interface to/from baseband logic, a buffer, and so forth. Alternatively, wireless station 110 may be implemented to include a radio remote unit and a baseband unit (BBU). The baseband unit may include baseband receiving circuitry and baseband transmission circuitry. The baseband unit may include various elements, such as a modem, an encoder/decoder, a clock, memory, an interface to/from radio remote unit, and so forth.

According to an exemplary embodiment, wireless station 110 includes logic of a smart network device that provides small cell coverage. According to an exemplary embodiment, wireless station 110 includes logic that provides a next generation fronthaul service. For example, a 5G fronthaul service includes a discovery and neighbor selection service and a multi-active multi-path service. The discovery and neighbor selection service discovers and selects an adjacent wireless station 110. The multi-active multipath service provides a data forwarding plane from wireless station 110 to hub 150. The data forwarding plane may support multiple active routes and traffic flows associated with a session between end device 160 and a backend system. The 5G fronthaul service is described further below.

According to an exemplary embodiment, wireless station 110 includes logic that provides a next generation backhaul connection service. For example, a 5G backhaul connection service includes the reporting service and the backhaul control service. The reporting service provides data center 155 with control information regarding the state of intelligent wireless mesh network 105. The frequency of the reporting of the control information may be configurable, such as periodically, event-triggered, and/or some other time frame. According to an exemplary implementation, wireless station 110 includes a directional antenna that can wirelessly transmit data to and wirelessly receive data from hub 150. According to an exemplary embodiment, wireless station 110 transmits data to and receives data from hub 150 within a spectrum between about 70 GHz and about 90 GHz. According to other exemplary embodiment, the spectrum within which wireless station 110 and hub 150 communicates may be different. The backhaul control service receives control information from the backend system and configures wireless station 110 to provide the fronthaul service. The 5G backhaul connectivity service is described further below.

Hub 150 includes a network device that has computational and wireless communicative capabilities. According to an exemplary implementation, hub 150 may be a macrocell site that provides macro cell coverage. For example, hub 150 may include an eNB. According to another exemplary implementation, hub 150 may be a dedicated node. For example, hub 150 may include a gateway. According to an exemplary embodiment, hub 150 includes a wireless station to wirelessly transmit data to and wirelessly receive data from wireless station 110. According to an exemplary embodiment, hub 150 transmits data to and receives data from wireless station 110 within a spectrum between about 70 GHz and about 90 GHz. According to other exemplary embodiment, the spectrum within which hub 150 and wireless station 110 communicates may be different and between about 1 GHz and about 100 GHz. The connectivity between wireless stations 110 and hub 150 may be implemented according to various topologies. For example, wireless stations 110 and hub 150 may be connected according to a point-to-point, point-to-multipoint, a star topology, or a mesh topology.

Hub 150 includes logic that provides a small cell aggregation service. For example, hub 150 provides traffic aggregation based on the data flows from and to wireless stations 110. The traffic aggregation may include various traffic handling mechanisms, such as total aggregation or partial aggregation, queuing, scheduling, filtering, and/or load balancing. According to an exemplary implementation, hub 150 includes baseband units for wireless stations 110. According to other exemplary implementations, hub 150 does not include baseband units for wireless stations 110.

According to an exemplary embodiment, hub 150 includes an optical fiber interface that provides backhaul connectivity to data center 155. According to other exemplary embodiments, hub 150 includes a wireless interface or another type of wired interface that provides backhaul connectivity to data center 155. According to an exemplary implementation, hub 150 includes a baseband unit for data center 155.

Data center 155 includes a network device that has computational capabilities. According to an exemplary embodiment, data center 155 provides a next generation backhaul service. For example, a 5G backhaul service includes a backend connection service and a mesh network controller service. The backend connection service provides connectivity to other networks, such as the Internet, the Web, a core network, or other type of backend system or network (not illustrated). The mesh network controller service manages mesh topology and routing of intelligent wireless mesh network 105. According to an exemplary implementation, data center 155 includes baseband units for wireless stations 110. The 5G backhaul service is described further below.

End device 160 includes a device that has computational and wireless communicative capabilities. End device 160 may be implemented as a mobile device, a portable device, or a stationary device. End device 160 may be implemented as a machine-type communication (MTC) device, an Internet of Things (IoT) device, a machine-to-machine (M2M) device, or an end user device. For example, the end user device may be implemented as a smartphone, a personal digital assistant, a tablet, a laptop, a netbook, a phablet, a wearable device, a set top box, an infotainment system in a vehicle, a game system, a music playing system, or some other type of wireless device (e.g., a kiosk, etc.). According to an exemplary embodiment, end device 160 includes logic that provides a multiple-input-multiple-output (MIMO) service. The MIMO service permits end device 160 to transmit data to and receive data from multiple wireless stations 110 in support of an end device session. For example, end device 160 may include logic that provides antenna correlation, beamforming, spatial diversity, interference mitigation, full-duplex communication, etc.

Figure 2A:
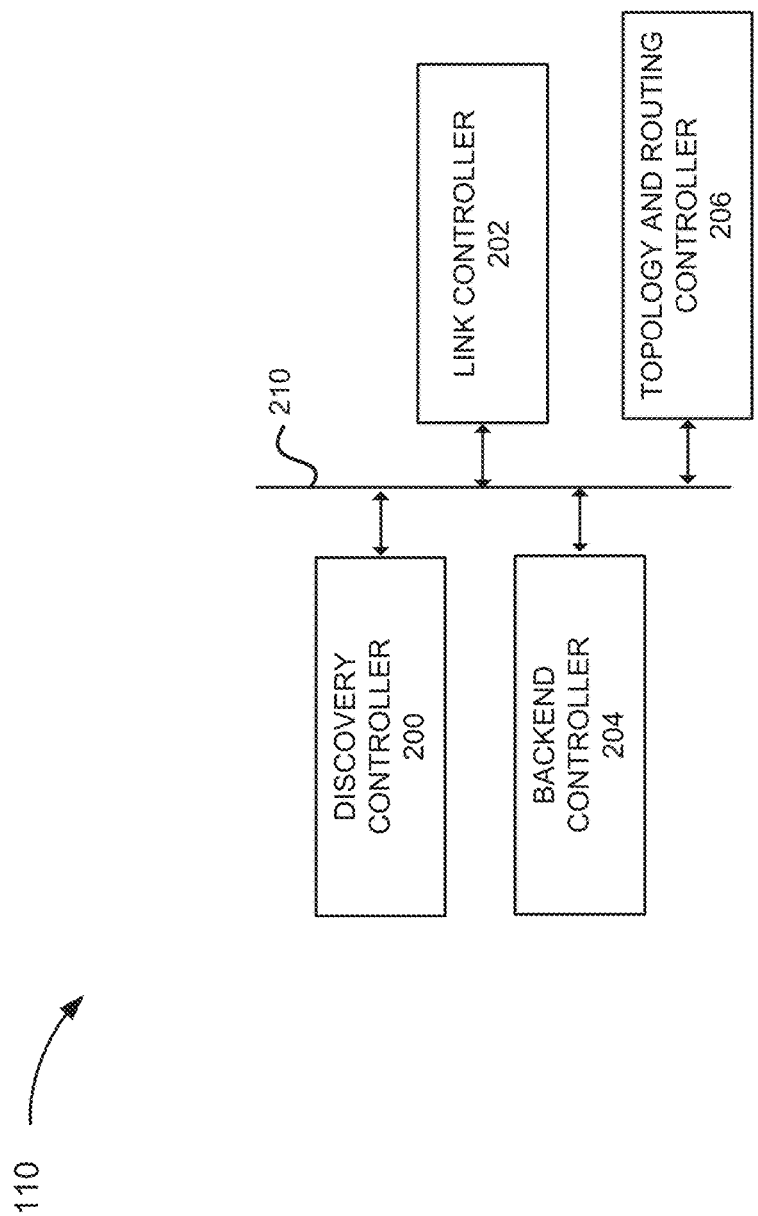
FIG. 2A is a diagram illustrating exemplary elements of a wireless station depicted in FIG. 1.

FIG. 2A is a diagram illustrating exemplary elements of an exemplary embodiment of wireless station 110. As illustrated, wireless station 110 includes a discovery controller 200, a link controller 202, a backend controller 204, and a topology and routing controller 206. According to other exemplary embodiments, wireless station 110 may include additional, fewer, and/or different elements than those illustrated in FIG. 2A and described herein. Additionally, multiple elements may be combined into a single element and/or a single element may be implemented as multiple elements in which a process or a function may be collaboratively performed or multiple processes or functions may be split between them. According to various embodiments, one or more of the elements may operate on various planes of environment 100. For example, the various planes may include a data plane, a control plane, a management plane, and/or other planes implemented within environment 100. According to an exemplary embodiment, discovery controller 200, link controller 202, backend controller 204, and topology and routing controller 206 include logic that support the 5G fronthaul service and the 5G backhaul connection service, as described herein.

Link 210 provides a communicative link between two or more elements. Link 210 may be implemented as a hardware link (e.g., a bus, a shared memory space, etc.), a software link (e.g., inter-process communication (IPC), etc.), or a combination thereof.

Discovery controller 200 includes logic that searches for an adjacent wireless station 110. Discovery controller 200 may control an antenna system of wireless station 110 in terms of tilt, direction, panning, etc., as well as other parameters, such as scan frequency, beam forming, transmit power, etc. Discovery controller 200 includes logic that evaluates a signal received from a candidate wireless station 110 to determine whether the signal satisfies a threshold minimum value. For example, discovery controller 200 may measure the received power of a reference signal and compare the measured power to a threshold value. Discovery controller 200 may also calculate other parameters (e.g., reference signal quality, signal-to-noise ratio (SNR), signal-to-interference-plus-noise ratio (SINK), etc.) based on the measured reference signal and compare the calculated parameter to a threshold value. Discovery controller 200 may search for a minimum number and/or a maximum number of adjacent wireless stations 110. The minimum number and/or the maximum number of adjacent wireless stations 110 may be configured by an administrator of intelligent wireless mesh network 105.

Discovery controller 200 includes logic that supports the backhaul control service, as described herein. For example, discovery controller 200 includes logic that configures the discovery service based on control information received from data center 155.

Link controller 202 includes logic that establishes, maintains, and tears down links relative to other wireless stations 110 in intelligent wireless mesh network 105. Link controller 202 includes logic that calculates a link budget parameter for a link in which discovery controller 200 indicates that the threshold value has been satisfied. According to an exemplary implementation, link controller 202 calculates a link budget for a line of sight (LOS) link with sufficient Fresnel Zone clearance. According to other exemplary implementations, link controller 202 calculates a link budget for a non-line of sight (NLOS) link. Link controller 202 may use various parameters pertaining to system gain, free-space path loss, multipath and fade margin, availability, signal-to-noise ratio (SNR), etc., to calculate the link budget. Provided below is Table 1 that illustrates exemplary link budget information used to calculate a link budget for a line of sight link.

TABLE 1

| Parameter | Wireless station A | Wireless station B |
| --- | --- | --- |
| Latitude | 38 19 49.93 N | 38 19 42.42 N |
| Longitude | 122 00 29.92 W | 121 59 49.71 W |
| True azimuth (°) | 103.34 | 283.34 |
| Vertical angle (°) | 7.61 | −7.43 |
| Elevation (ft) | 226.33 | 689.70 |
| Antenna model | SB1-W800CNEI-FCC (TR) | SB1-W800CNEI-FCC (TR) |
| Antenna gain (dBi) | 44.00 | 44.00 |
| Antenna height (ft) | 8.00 | 8.00 |
| TX loss (dB) | 0.00 | 0.00 |
| RX loss (dB) | 0.00 | 0.00 |
| Radio model | 80 GHz 500 m 64Q | 80 GHz 500 m 64Q |
| TX power (dBm) | 11.00 | 11.00 |
| Equivalent Isotropically Radiated Power (EIRP) (dBm) | 55.00 | 55.00 |
| Receive signal (dBm) | −32.52 | −32.52 |
| Thermal fade margin (dB) | 23.48 | 23.48 |
| Effective fade margin (dB) | 23.19 | 23.19 |
| Annual rain + multipath availability (%) | 99.99979 | |
| Annual rain + multipath unavailability (%) | 0.00021 | |
| Annual rain + multipath unavailability (min) | 1.08 | |

According to other exemplary implementations, the link budget information may include additional, fewer, and/or different factors, values, etc. than those illustrated in Table 1. For example, link budget information may include a value pertaining to loss resulting from NLOS-propagation effects, distance between wireless stations, and/or other types of parameters and values.

Link controller 202 includes logic that calculates a link budget value representative of the link budget based on the parameters and values. Link controller 202 includes logic that compares the link budget value to a threshold link budget value to determine whether the link is satisfactory. When link controller 202 determines that the link budget value satisfies the threshold link budget value, link controller 202 includes logic to establish the link. For example, link controller 202 may perform various handshaking processes with the adjacent wireless station 110 to establish the link. By way of further example, link controller 202 may time synchronize with the adjacent wireless station 110, exchange communication information (e.g., transmit and receive frequencies, etc.), perform authentication, etc. When link controller 202 determines that the link budget value does not satisfy the threshold link budget value, link controller 202 may discard this link as a candidate link for forwarding traffic. According to other implementations, link controller 202 may also compare a parameter and value of the link budget to a threshold parameter value. When link controller 202 determines that the parameter and value do not satisfy the threshold parameter value, link controller 202 may discard this link as a candidate link for forwarding traffic.

Link controller 202 includes logic that continually monitors link state and updates the link budget for an active link (e.g., traffic flowing via the link) and an established link (e.g., traffic not flowing via the link). Link controller 202 may generate and store link information that includes, for example, link parameters and values, link calculations, and link budget reports. The link information is made available to the 5G backhaul service via the reporting service of wireless station 110. Links may be established, maintained, and torn down based on control information received from data center 155. Link controller 202 includes logic that supports the backhaul control service, as described herein. For example, link controller 202 includes logic that configures the neighbor selection service and the reporting service based on control information received from data center 155.

Backend controller 204 includes logic that provides the reporting service. Backend controller 204 manages backend communication to and from hub 150 and data center 155. According to an exemplary implementation, backend controller 204 may transmit control information, such as link information (e.g., link parameters, link calculations, link budget reports), service performance information (e.g., service performance parameters, service performance calculations, service performance reports), and traffic flow information to hub 150 or data center 155. According to other exemplary implementations, backend controller 204 may transmit additional, fewer, and/or different instances of control information. For example, backend controller 204 may transmit network topology information that indicates a topology (e.g., full or partial) of intelligent wireless mesh network 105. Also, backend controller 204 may receive various types of control information. According to an exemplary implementation, backend controller 204 may receive network topology information pertaining to the topology (e.g., full or partial) of intelligent wireless mesh network 105 and routing and forwarding information from hub 150 or data center 155. According to other exemplary implementations, backend controller 204 may receive additional, fewer, and/or different instances of control information. For example, the mesh network controller service of data center 155 may provide a control instruction to wireless station 110 via backend controller 204. The control instruction may instruct wireless station 110 to operate in a certain manner. The control instruction may be temporary (e.g., in effect for a particular time period, condition, etc.), permanent, etc. As an example, a control instruction may indicate to wireless station 110 not to update network topology information when a new link with a new wireless station 110 is established, but to merely report the condition of the link between wireless station 110 and the new wireless station 110 for a specified period of time.

Backend controller 204 includes logic that makes available the control information from hub 150 or data center 155 to wireless station 110 so as to provide the 5G fronthaul service and the backhaul connection service. For example, the control information received may be used by the backhaul control service of wireless station 110 that configures wireless station 110 (e.g. an element, such as topology and routing controller 206, link controller 202, etc.) according to the control information, and in turn provide the multi-active multi-path service, the neighbor selection service, etc.

Topology and routing controller 206 includes logic that manages network topology and routing of traffic on various planes. Topology and routing controller 206 stores a routing table and a forwarding table. The routing table and the forwarding table may store various types of information, such as interface and port information, network address information, and path information. For example, path information may include routes, virtual local area networks (VLANs), virtual circuits (VC), tunnels, pipes, and/or other communication segments within intelligent wireless mesh network 105 to be used to provide the fronthaul service. According to an exemplary implementation, topology and routing controller 206 includes logic that provides Internet Protocol (IP) routing and forwarding. According to an exemplary implementation, topology and routing controller 206 includes logic that provides routing and forwarding of traffic based on shortest paths. According to another exemplary implementation, topology and routing controller 206 includes logic that provides routing and forwarding of traffic based on shortest paths and other traffic requirements/performance metrics (e.g., jitter, latency, bit error rate, packet loss, etc.).

Topology and routing controller 206 includes logic that monitors traffic that is received and transmitted via a plane of intelligent wireless mesh network 105. Topology and routing controller 206 may generate traffic flow information based on the monitoring. For example, the traffic flow information may include source address, destination address, source port, destination port, class of service, timestamps relating to a time period of the traffic flow at wireless station 110 (e.g., beginning, end, etc.), and/or other contextual or characteristic information pertaining to the traffic flow (e.g., the plane via which the traffic flow traverses, etc.).

Topology and routing controller 206 includes logic that provides operations, administration, and maintenance (OAM) functions. For example, the OAM functions include performance monitoring of various metrics, such as latency (e.g., roundtrip, one-way), jitter, packet loss, availability, throughput, error rate, link utilization, and service level agreement parameters, such as committed information rate (CIR), committed burst size, excess information rate, excess burst rate, etc. Additionally, for example, the OAM functions include fault detection of various conditions, such as loopback, fault localization (e.g., wireless station, link), etc., and fault management, such as AIS functions, remote defect detection, etc. Topology and routing controller 206 may generate and store service performance information based on the OAM functions.

Topology and routing controller 206 includes logic that supports the backhaul control service, as described herein. For example, topology and routing controller 206 includes logic that configures the multi-active multi-path service and the reporting service based on control information received from data center 155.

Figure 2B:
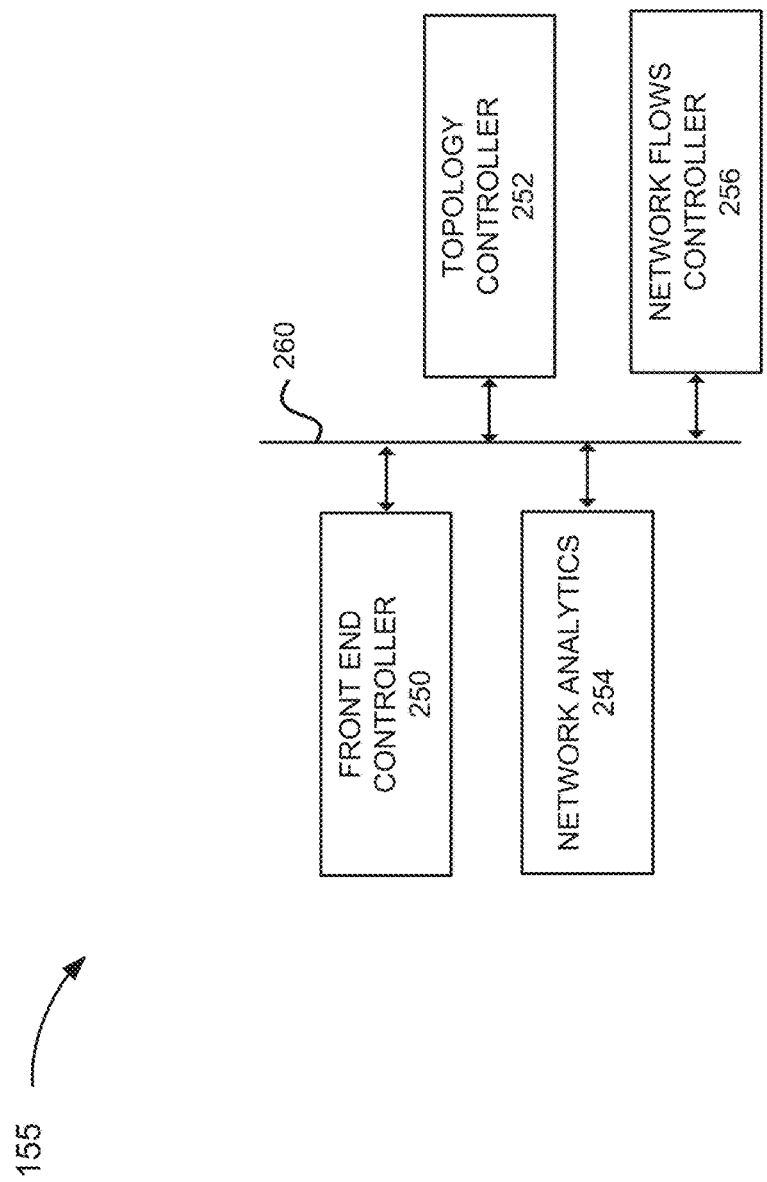
FIG. 2B is a diagram illustrating exemplary elements of a data center depicted in FIG. 1.

FIG. 2B is a diagram illustrating exemplary elements of an exemplary embodiment of data center 155. As illustrated, data center 155 may include a front end controller 250, a topology controller 252, network analytics 254, and a network flows controller 256. According to other exemplary embodiments, data center 155 may include additional, fewer, and/or different elements than those illustrated in FIG. 2B and described herein. Additionally, multiple elements may be combined into a single element and/or a single element may be implemented as multiple elements in which a process or a function may be collaboratively performed or multiple processes or functions may be split between them. According to various embodiments, one or more elements may operate on various planes of environment 100. For example, the various planes may include a data plane, a control plane, a management plane, and/or other planes implemented within environment 100.

Link 260 provides a communicative link between two or more elements. Link 210 may be implemented as a hardware link (e.g., a bus, a shared memory space, etc.), a software link (e.g., IPC, etc.), or a combination thereof.

Front end controller 250 includes logic that manages backend communication to and from hub 150 and wireless station 110. For example, front end controller 250 may receive control information, such as link information, service performance information, and traffic flow information from wireless station 110. According to other exemplary implementations, front end controller 250 may receive additional, fewer, and/or different instances of control information. For example, front end controller 250 may receive network topology information that indicates a topology (e.g., full or partial) of intelligent wireless mesh network 105. Also, front end controller 250 may transmit various types of control information, such as network topology information pertaining to intelligent wireless mesh network 105, control instructions, and routing and forwarding information to hub 150 or wireless station 110. According to other exemplary implementations, front end controller 250 may transmit additional, fewer, and/or different instances of control information.

Front end controller 250 includes logic that makes available the control information from hub 150 or wireless station 110 so as to provide the 5G backhaul service. For example, the control information may be used by the mesh network controller service of data center 155 to govern operation of wireless station 110 and intelligent wireless mesh network 105. For example, topology controller 252, network analytics 254, and network flows controller 256 of data center 155 uses the control information to monitor, configure, and manage the 5G fronthaul and 5G backhaul connection services provided by wireless station 110 and intelligent wireless mesh network 105.

Topology controller 252 includes logic that stores, manages, and updates network topology information pertaining to intelligent wireless mesh network 105. According to an exemplary embodiment, the network topology information includes the topology of wireless stations 110 and links. Topology controller 252 includes logic that uses network analytic information to continually update the network topology information of intelligent wireless mesh network 105. The network topology information may also include the topology of hub 150 and other data center 155. Topology controller 252 uses the control information (e.g., link information, etc.) from wireless station 110 and other elements (e.g., hub 150, other data center 155) to calculate the current topology.

Network analytics 254 includes logic that analyzes the link information, the service performance information, the traffic flow information, and the network topology information. Based on the analysis, network analytics 254 calculates the current state of intelligent wireless mesh network 105. For example, network analytics 254 determines the state of wireless stations 110 and links between wireless stations 110, between wireless station 110 and hub 150 as active/inactive, up/down, etc. Additionally, network analytics 254 calculates performance metrics, such as throughput, latency, jitter, packet loss, availability, error rate, link utilization, service level agreement parameters (e.g., CIR, etc.), and/or other types of network performance and/or traffic characteristics pertaining to intelligent wireless mesh network 105. Network analytics 254 may also determine the state of hubs 150, other data center 155, the state of links between hub 150 and data center 155, between data centers 155, the state of hub 150, the state of other data center 155, and/or other elements included in a 5G fronthaul and/or backhaul infrastructure.

Figure 3:
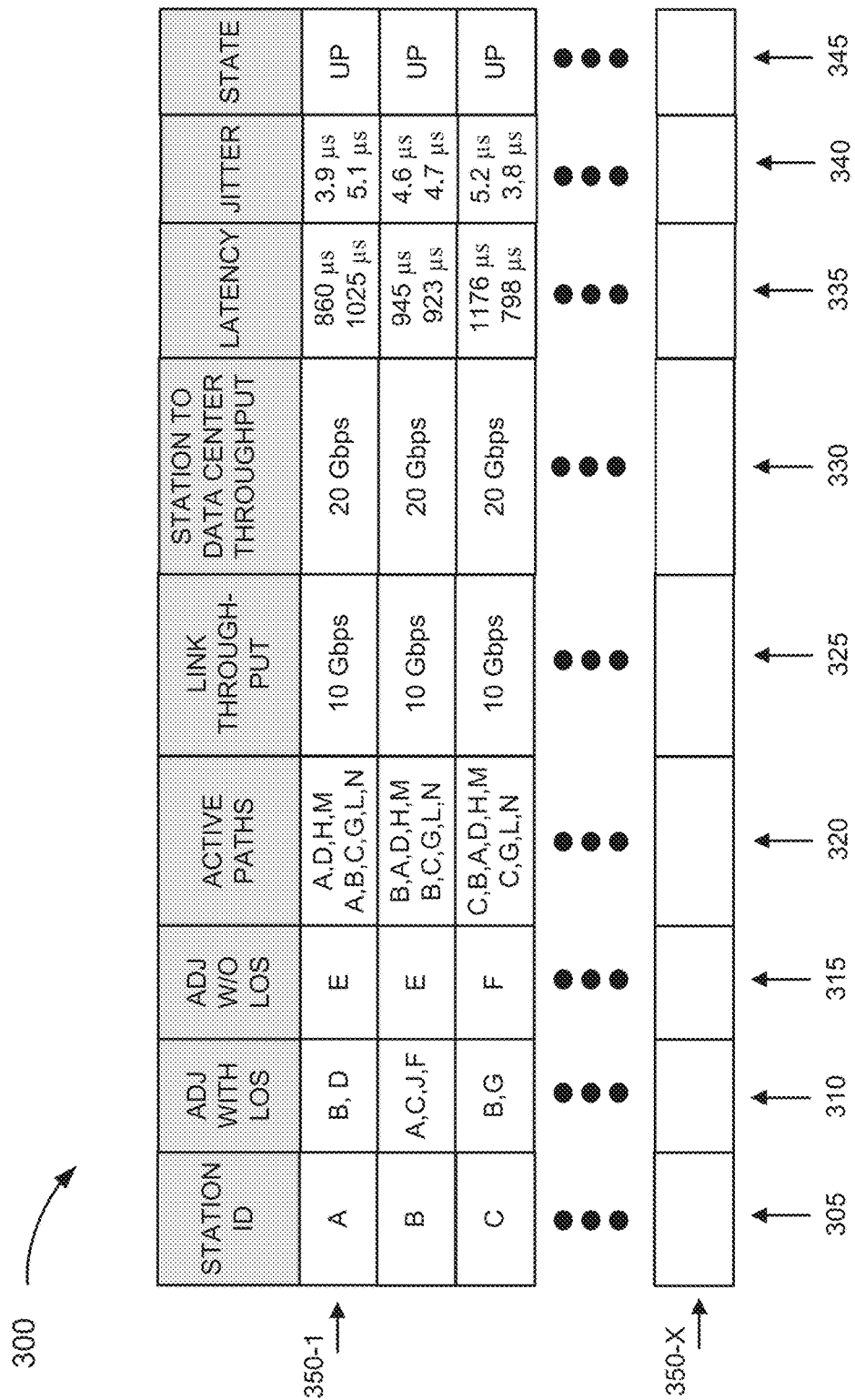
FIG. 3 is a diagram illustrating an exemplary table that stores network information.

Network analytics 254 includes logic that stores network information indicative of the current state. According to an exemplary embodiment, network analytics 254 includes a database management system (DBMS). The DBMS may be implemented using conventional, well-known, or commercially available relational or No Structured Query Language (NoSQL) software/packages (e.g., Microsoft SQL, Oracle Database, Cassandra, MongoDB, etc.). Network analytics 254 includes a storage device that stores a database. The database may store the network information in various types of data structures, an example of which is described below. FIG. 3 is a diagram that illustrates exemplary types of network information that may be stored in a table 300. As illustrated, table 300 includes a station identifier field 305, an adjacency with LOS field 310, an adjacency without LOS field 315, an active paths field 320, a link throughput field 325, a station to data center throughput field 330, a latency field 335, a jitter field 340, and a state field 345. As further illustrated, table 300 includes profiles 350-1 through 350-X (also referred to as profiles 350 and, individually and generically as profile 350). Each profile 350 includes a grouping of data fields 305 through 345. Each profile 350 includes at least one instance of network information that is different from another profile 350.

Station identifier field 305 stores data that indicates a unique identifier of wireless station 110. For example, the unique identifier may be numeric, alphanumeric, alphabetic, etc. Adjacency with LOS field 310 stores data that indicates a wireless station 110 to which a line of sight exists relative to the wireless station 110 identified in station identifier field 305. Adjacency without LOS field 315 stores data that indicates a wireless station 110 to which a line of sight does not exist relative to the wireless station 110 identified in station identifier field 305.

Active paths field 320 stores data that indicates an active path of which the wireless station 110 identified in station identifier field 305 is a node. Link throughput field 325 stores data that indicates a link throughput between the wireless station 110 identified in station identifier field 305 and another wireless station 110. Station to data center throughput field 330 stores data that indicates the throughput from the wireless station 110 identified in station identifier field 305 to data center 155.

Latency field 335 stores data that indicates a latency for an active path. Jitter field 340 stores data that indicates a jitter for an active path. State field 345 indicates the state of the wireless station 110 identified in station identifier field 305.

According to other implementations, table 300 may store additional instances of network information, fewer instances of network information, and/or different types of network information. By way of example, table 300 may store network information pertaining to other elements (e.g., hub 150, other data center 155, other links), other types of performance metrics (e.g., packet loss, etc.), contextual information (e.g., geographic information pertaining to intelligent wireless mesh network, wireless station 110, etc.; day, time, etc.), and/or other network operational information (e.g., congestion, etc.).

Referring back to FIG. 2B, network flows controller 256 includes logic that calculates routing and forwarding information based on the network information. According to an exemplary implementation, network flows controller 256 includes logic that calculates routing and forwarding of traffic based on one or multiple administrative parameters. For example, an administrative parameter may indicate a minimum number N of active paths allocated to an end user session or end device traffic. Additionally, or alternatively, an administrative parameter may indicate a maximum number X of active paths allocated to an end user session or end device traffic. Additionally, or alternatively, an administrative parameter may indicate a metric. For example, the metric may include a shortest path metric and/or one or multiple traffic requirements/performance metrics (e.g., jitter, latency, throughput, bit error rate, packet loss, etc.). According to an exemplary implementation, for the multi-active multi-path service, network flows controller 256 calculates disjoint paths (e.g., edge, vertex, etc.). According to other exemplary implementations, network flows controller 256 calculates paths that are not disjoint paths.

Figure 4:
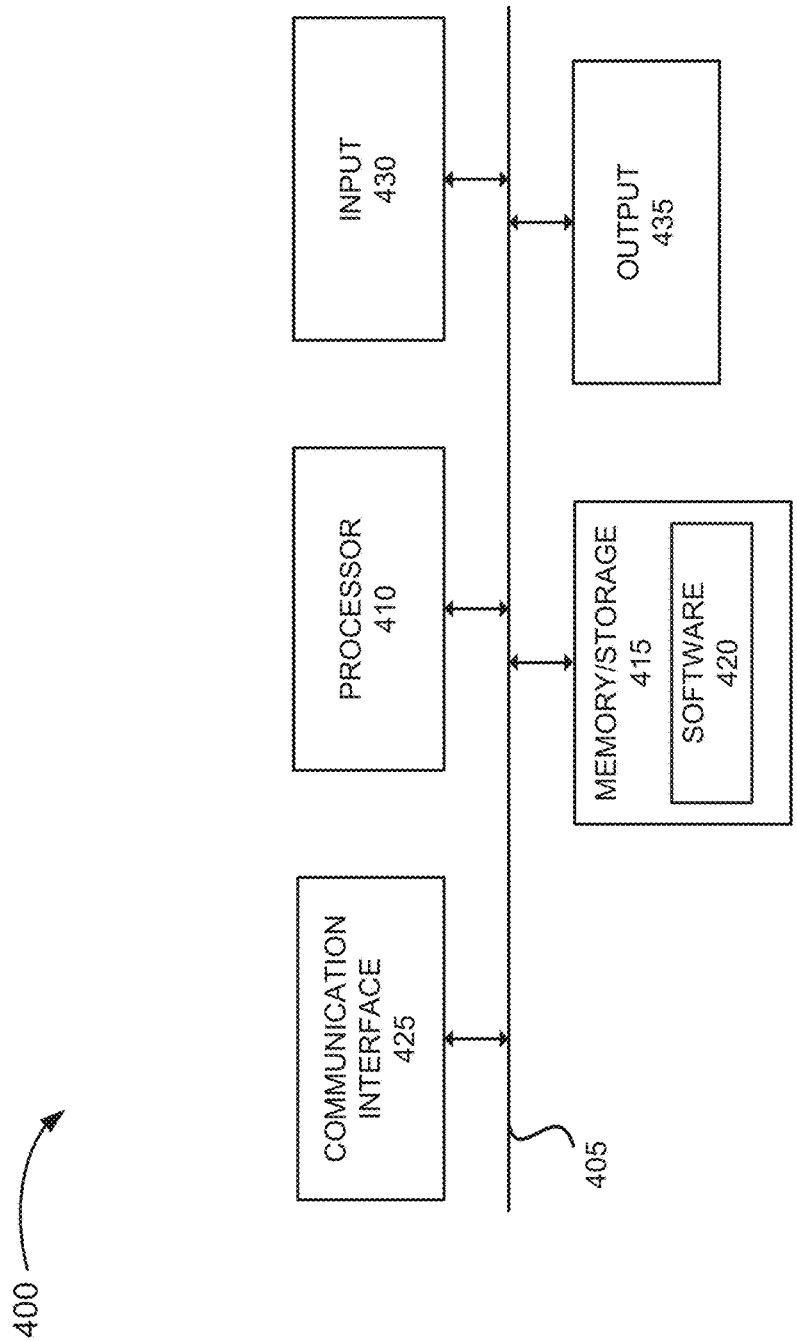
FIG. 4 is a diagram illustrating exemplary components of a device that may correspond to one or more of the devices illustrated herein.

FIG. 4 is a diagram illustrating exemplary components of a device 400 that may correspond to one or more of the devices described herein. For example, device 400 may correspond to components of wireless station 110, hub 150, data center 155, and end device 160. Additionally, exemplary elements of devices may be implemented based on the components described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 415 may include a hard disk (e.g., a magnetic disk, an optical disk, a magneto-optic disk, a solid state disk, etc.) and a corresponding drive. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to wireless station 110, software 420 may include an application that, when executed by processor 410, provides the functions of the 5G fronthaul service and the 5G backhaul connection service, as described herein. Additionally, hub 150 may include an application that, when executed by processor 410, provides the small cell aggregation service, as described herein. Also, data center 155 may include an application that, when executed by processor 410, provides the functions of the 5G backhaul service. Similarly, end device 160 may include an application that, when executed by processor 410, provides the functions of the MIMO service, as described herein. Software 420 may also include firmware, middleware, microcode, hardware description language (HDL), and/or other form of instruction.

Communication interface 425 permits device 400 to communicate with other devices, networks, systems, and/or the like. Communication interface 425 includes one or multiple wireless interfaces. Communication interface 425 may include one or multiple wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, etc.).

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5A:
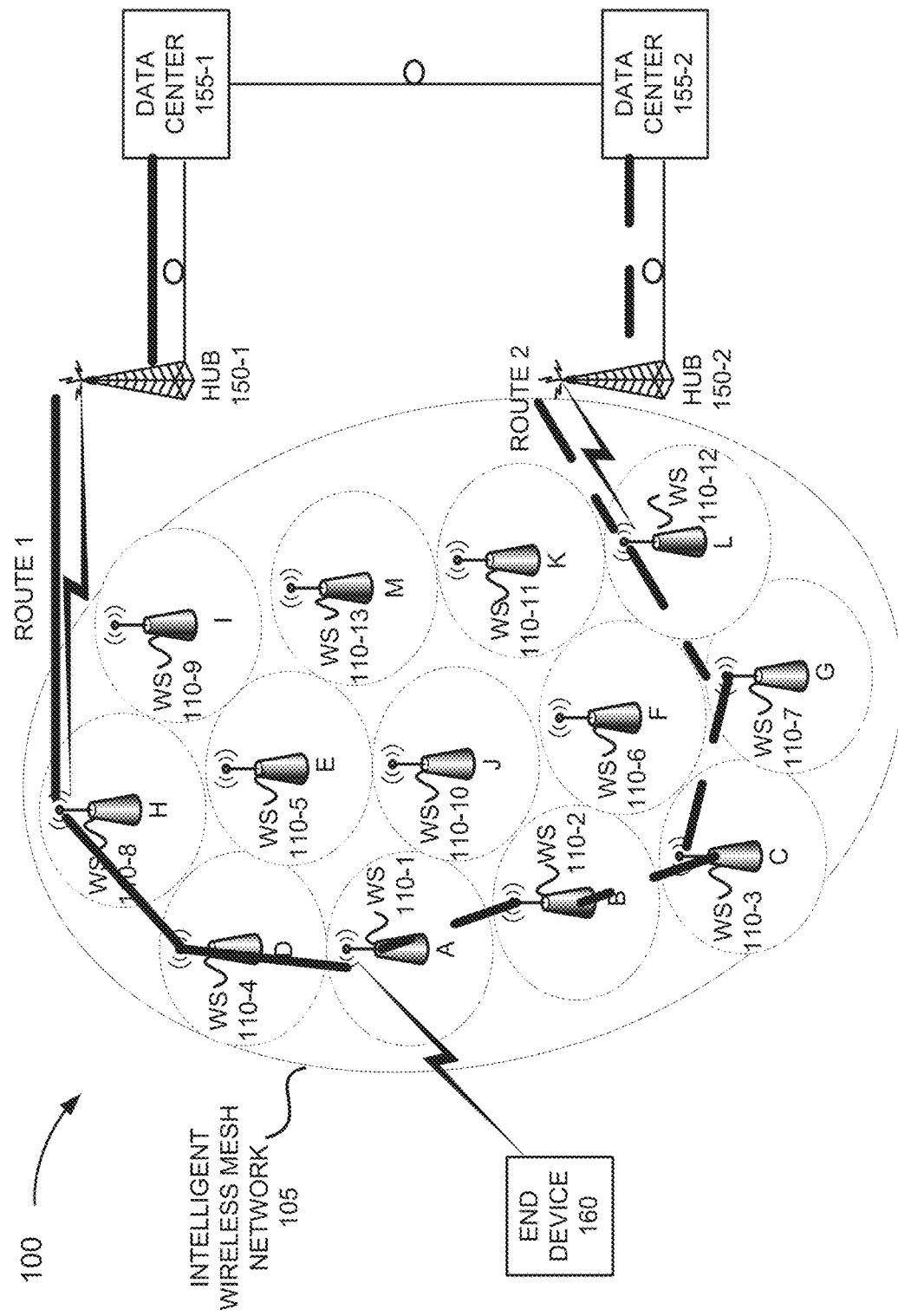
FIGS. 5A-5E are diagrams illustrating an exemplary process of the 5G fronthaul and backhaul services.
Figure 5B:
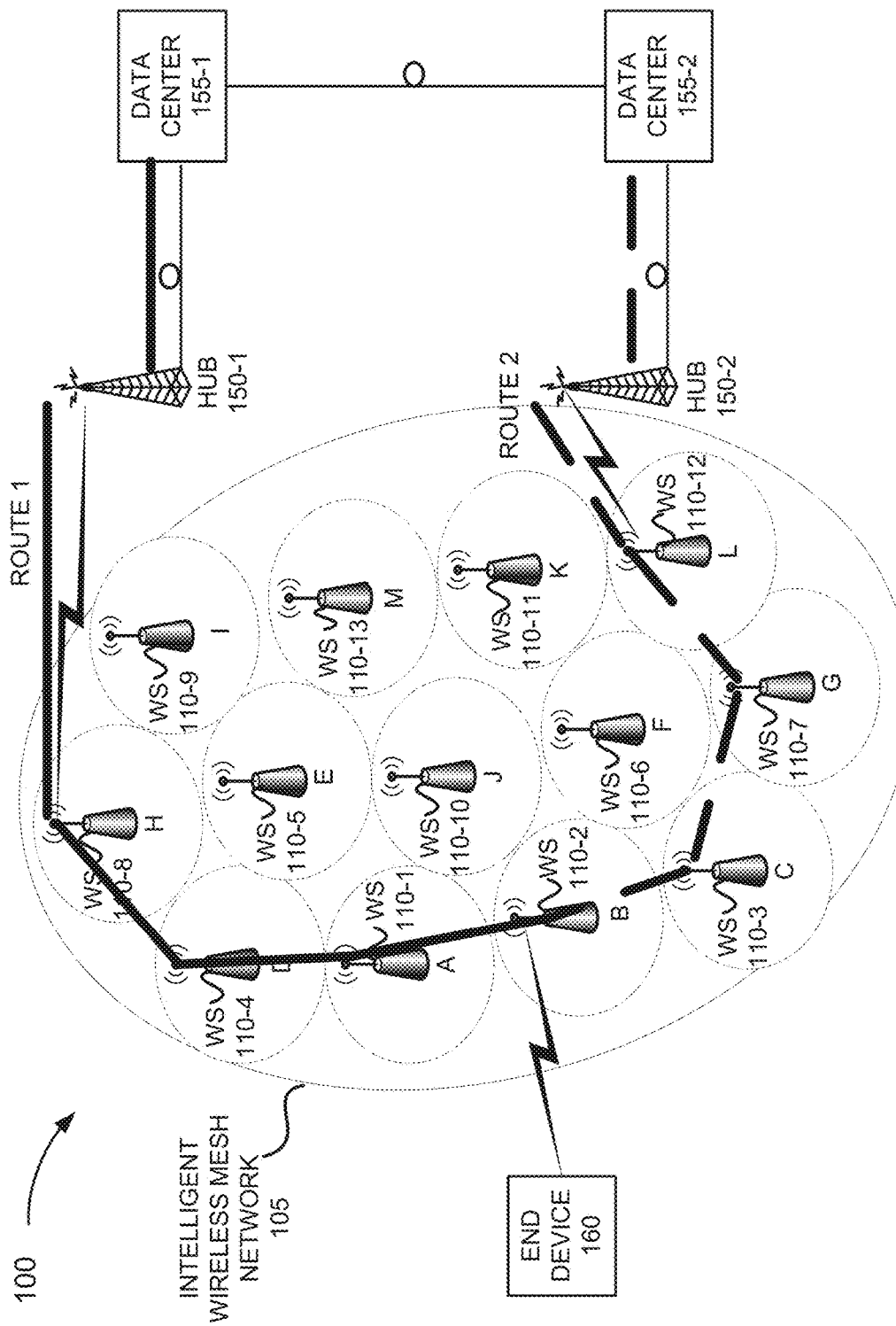
Figure 5C:
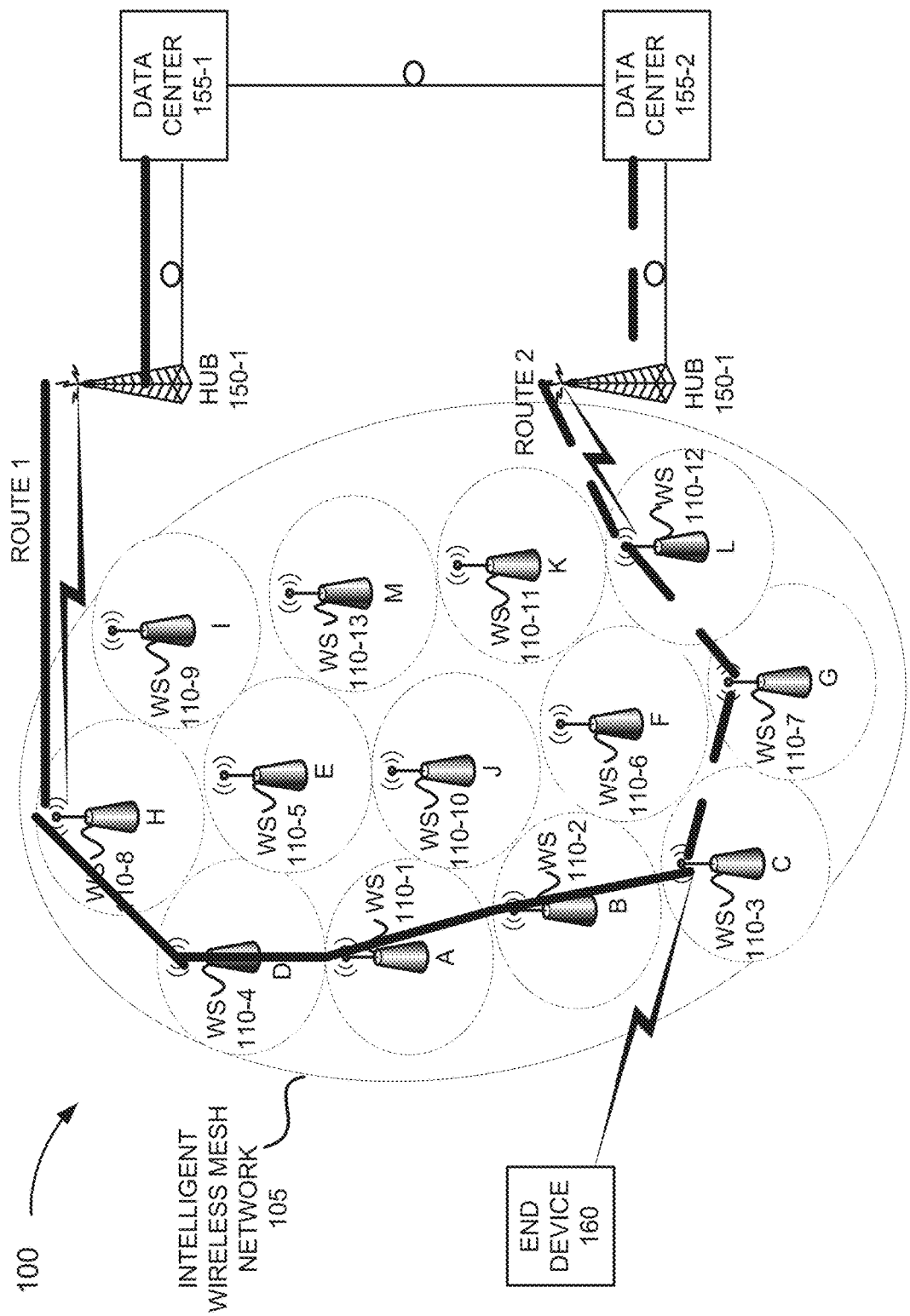
Figure 5D:
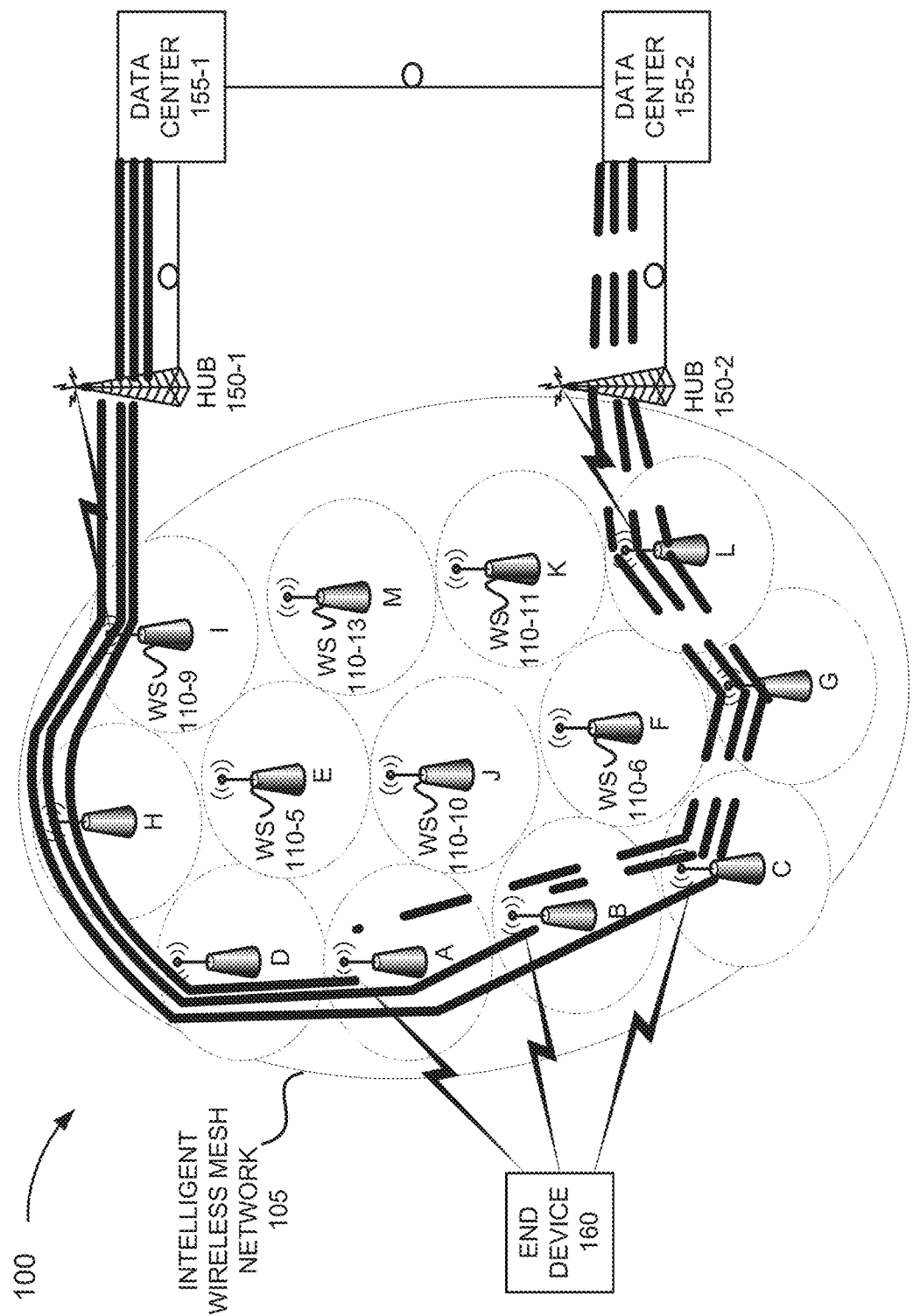
Figure 5E:
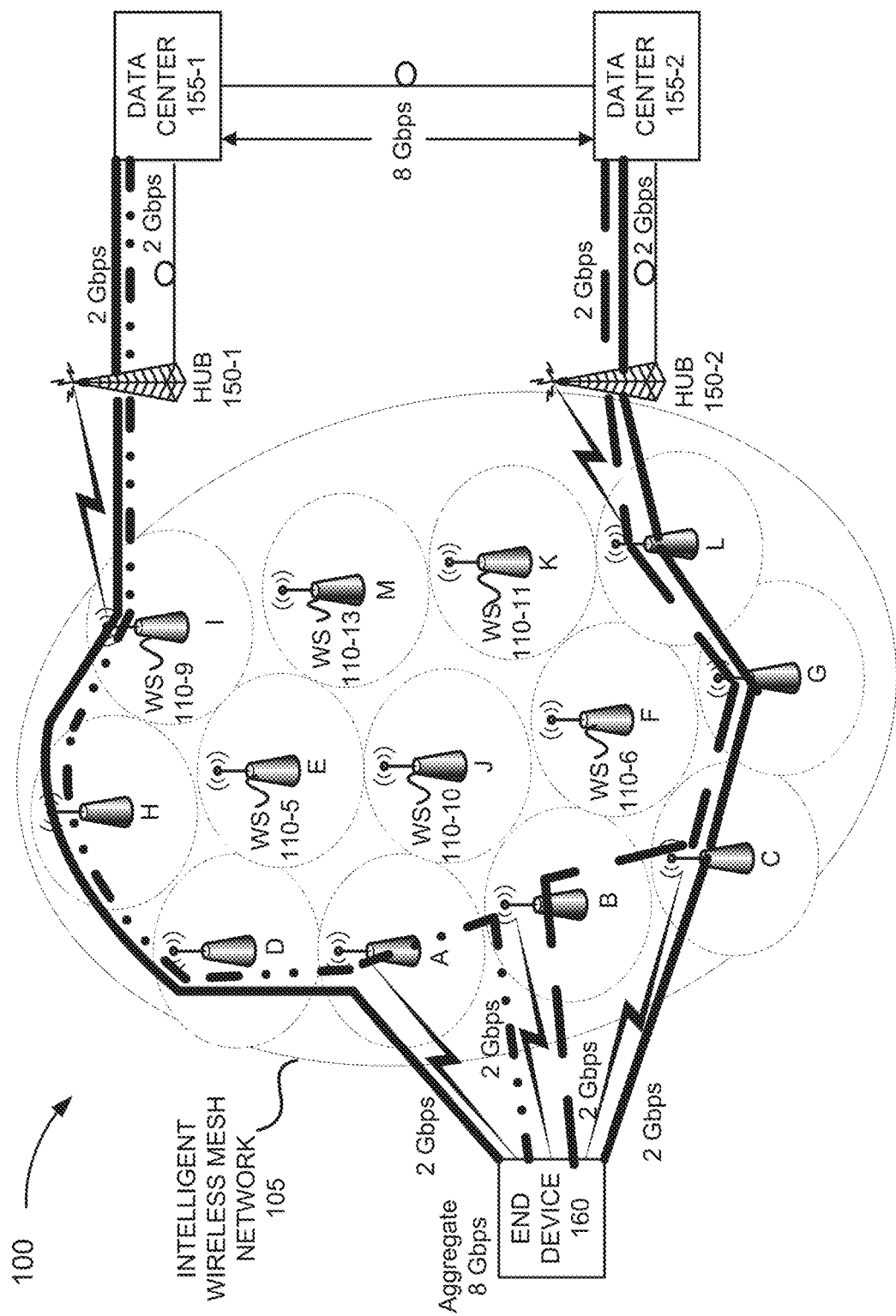

FIGS. 5A-5E are diagrams illustrating an exemplary process of the 5G fronthaul and backhaul connection services. Referring to FIGS. 5A-5C, assume that end device 160 establishes communication links with data centers 155-1 and 155-2 via wireless stations 110 (A), (B), and (C), respectively. For example, each wireless station 110 selects one route to data center 155-1 via hub 150-1 and another route to data center 155-2 via hub 150-2. As a result, based on a cooperative effort between the MIMO service of end device 160 and the multi-active multi-path service of intelligent wireless mesh network 105, end device 160 may have multi-active multi-paths simultaneously established with data centers 155, as illustrated in FIG. 5D. The selection of the routes and paths are based on the mesh network controller service of data center 155. For example, referring to FIG. 5E, assume that on the data plane, end device 160 has an aggregated throughput of 8 Gbps in which wireless stations 110 (A), (B), and (C) share a respective load of 2 Gbps, 4 Gbps, and 2 Gbps. According to this example, each hub 150 shares an equal load of 4 Gbps and each data center 155 shares an equal load of 4 Gbps. The throughput of the data plane may be scaled by an administrative parameter, such as a minimum number N and/or a maximum number X of active paths allocated to the end user session, and/or another metric (e.g., a performance metric, etc.).

Figure 6A:
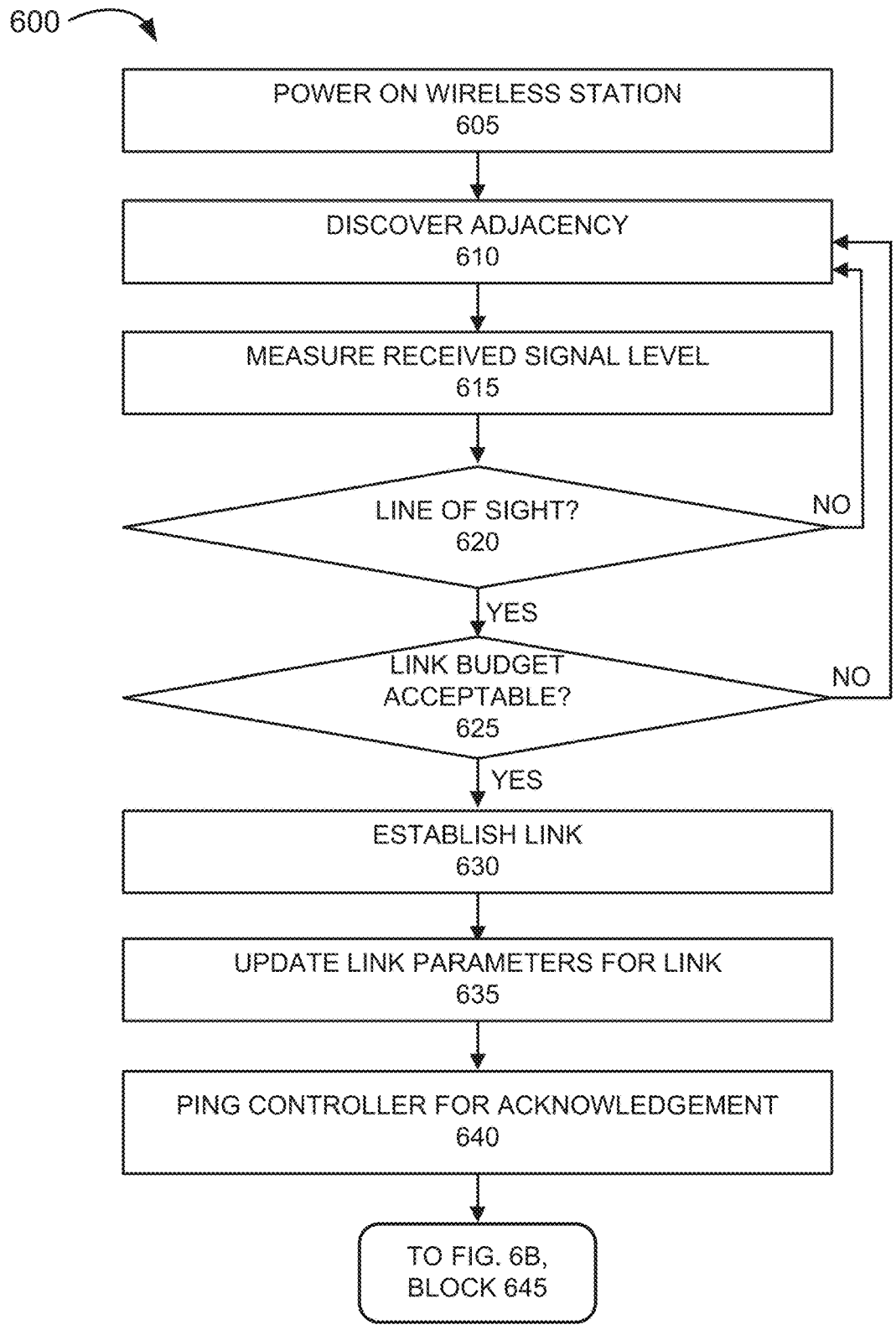
FIGS. 6A and 6B are flow diagrams illustrating an exemplary process of a fronthaul and backhaul connectivity service.
Figure 6B:
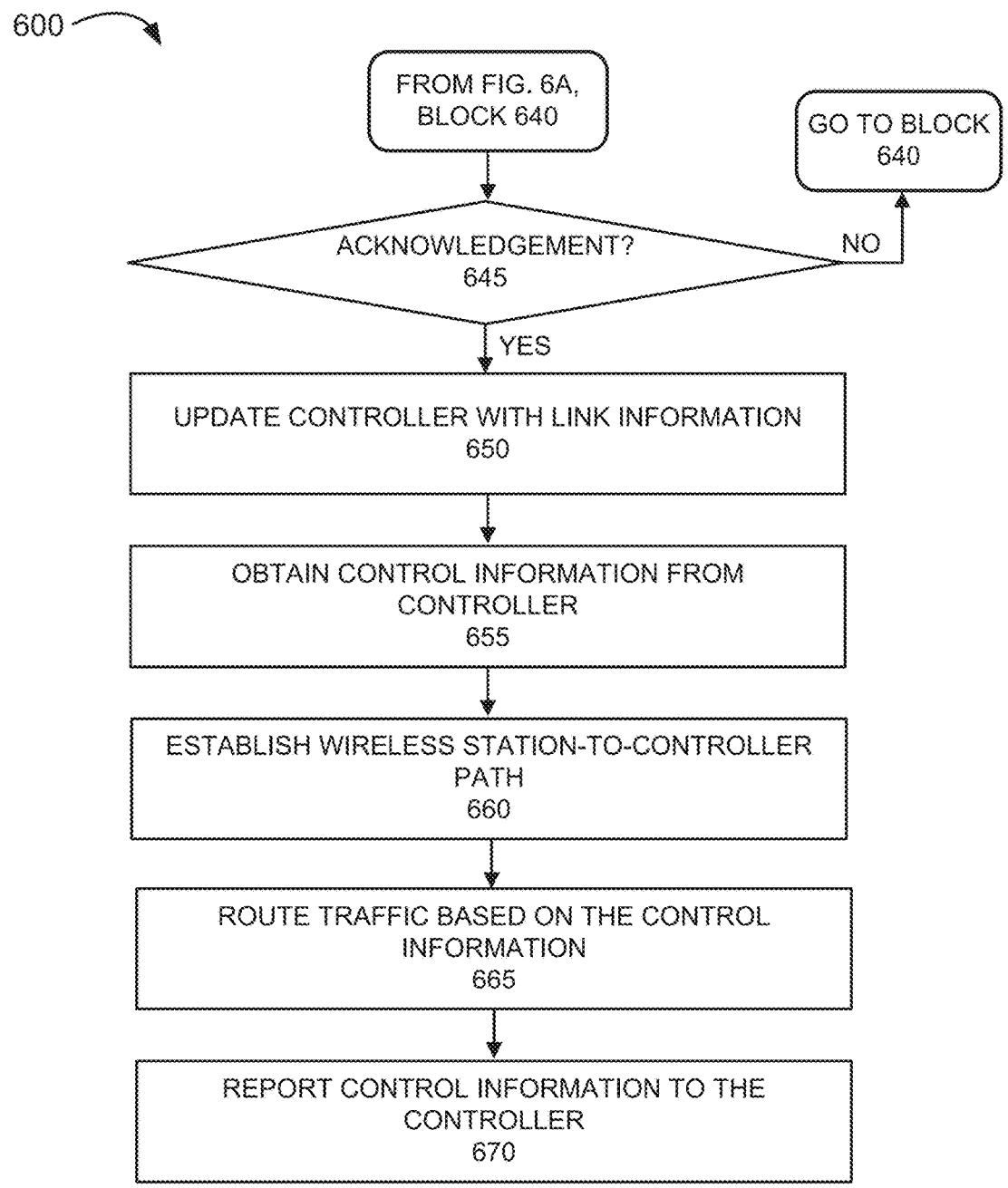

FIGS. 6A and 6B are flow diagrams illustrating an exemplary process 600 pertaining to the 5G fronthaul and backhaul connection services. Process 600 is directed to a process previously described above with respect to FIG. 2A, as well as elsewhere in this description. According to an exemplary embodiment, wireless station 110 performs steps of process 600. For example, processor 410 executes software 420 to perform the steps illustrated in FIGS. 6A and 6B and described herein.

Referring to FIG. 6A, block 605, process 600 may begin with powering on a wireless station. For example, wireless station 110 may be turned on by an installer when wireless station 110 is added to intelligent wireless mesh network 105. Alternatively, for example, wireless station 110 may be in state (e.g., sleep, idle, etc.) and awakes in response to a triggering event.

In block 610, adjacency is discovered. For example, discovery controller 200 of wireless station 110 searches for a signal transmitted by an adjacent or a neighbor wireless station 110. Discovery controller 200 may search for a minimum number and/or a maximum number of adjacent wireless stations 110.

In block 615, a received signal level is measured. For example, when discovery controller 200 finds a signal during its search, discovery controller 200 measures a received power of the signal and compares the measured power to a threshold value. Discovery controller 200 may also calculate other parameters (e.g., reference signal quality, signal-to-noise ratio (SNR), signal-to-interference-plus-noise ratio (SINR), etc.) based on the measured signal and compares the calculated parameter to a threshold value.

In block 620, it is determined whether the link is a line of sight link. For example, discovery controller 200 determines whether the candidate link is a line of sight link or not based on the comparison of the measured and/or calculated parameters to the threshold values. According to other exemplary implementations, process 600 may not include this step.

When it is determined that the link is not a line of sight link (block 620—NO), then process continues to block 610. For example, discovery controller 200 may discard the candidate link as a link for use in the data plane. Alternatively, for example, discovery controller 200 may label the candidate link as a non-line of sight link and proceed to block 625.

When it is determined that the link is a line of sight link (block 620—YES), it is determined whether a link budget is acceptable (block 625). For example, link controller 202 calculates a link budget based on various parameters. According to an exemplary implementation, link budget information may include various parameters pertaining to system gain, free-space path loss, multipath and fade margin, availability, signal-to-noise ratio (SNR), etc. Link controller 202 may calculate a link budget value representative of the link budget for the candidate link based on the link budget information. Link controller 202 may compare the link budget value to a threshold link budget value to determine whether the link budget is acceptable. According to other exemplary implementations, link controller 202 may also compare a parameter and value of the link budget to a threshold parameter value.

When it is determined that the link budget is not acceptable (block 625—NO), then process continues to block 610. For example, when the link budget value does not satisfy the threshold link budget value, link controller 202 determines that the link budget is not acceptable. In response, wireless station 110 may return to block 610 and attempt to discover another adjacent wireless station 110.

When it is determined that the link budget is acceptable (block 625—YES), the link is established (block 630). For example, when the link budget value satisfies the threshold link budget value, link controller 202 determines that the link budget is acceptable. In response, link controller 202 may perform various handshaking processes with the adjacent wireless station 110 to establish the link. By way of further example, link controller 202 may time synchronize with the adjacent wireless station 110, exchange communication information (e.g., transmit and receive frequencies, etc.), perform authentication, etc. Link controller 202 may perform a handshaking process relative to each adjacent wireless station 110.

In block 635, link parameters for the link are updated. For example, link controller 202 may store link information that includes, for example, link parameters and values, link calculations, and a link budget report for each link established with an adjacent wireless station 110.

In block 640, a controller is pinged for acknowledgement. For example, in response to discovering and establishing links with a minimum number of adjacent wireless stations 110, backend controller 204 may transmit a ping message on the control plane to data center 155. According to other examples, in response to discovering and establishing links with a maximum number of adjacent wireless stations 110, backend controller 204 may transmit a ping message on the control plane to data center 155.

Referring to FIG. 6B, in block 645, it is determined whether an acknowledgement is received. For example, backend controller 204 may determine whether a response message, which is responsive to the ping message and transmitted by data center 155, is received. When it is determined that the acknowledgement is not received (block 645—NO), then process 600 continues to block 640. For example, backend controller 204 may transmit another ping message. Backend controller 204 may use a back-off strategy before retransmitting a ping message after a failed attempt. Additionally, or alternatively, for example, backend controller 204 may invoke an error process when a certain number of failed attempts occur.

When it is determined that the acknowledgement is received (block 645—YES), the controller is updated with link information (block 650). For example, backend controller 204 may transmit the link information on the control plane to data center 155.

In block 655, control information is obtained from the controller. For example, backend controller 204 may receive control information from data center 155. The control information may include routing and forwarding information for one or multiple planes (e.g., data, control, etc.). The control information may include control instructions and/or network topology information.

In block 660, a wireless station-to-controller path is established. For example, wireless station 110 establishes a path on the data plane to data center 155 for each established link. According to an exemplary implementation, each path is disjoint relative to another path. According to another exemplary implementation, one or multiple paths may not be disjoint (e.g., in whole or in part). By way of example, the path may correspond to a virtual local area network path (VLAN) or other type of path, as described herein. Wireless station 110 may establish the path based on the control information from data center 155. In this way, wireless station 110 has an end-to-end connection with data center 155. Wireless station 110 may establish multiple end-to-end connections via different paths to data center 155. The path may include a route, a VLAN, a virtual circuit, a tunnel, a pipe, a flow, and/or other communication segment within intelligent wireless mesh network 105 to be used to provide the fronthaul service.

In block 665, traffic is routed based on the control information. For example, topology and routing controller 206 routes and forwards traffic to and from end device 160 based on the control information. Wireless station 110 may support one or multiple flows of traffic. The one or multiple flows may belong to a same end user session or different end user sessions. For example, referring back to FIG. 5E, wireless station 110 (B) is supporting two flows (e.g., each at 2 Gbps). Each of the flows may be associated with the same end user session (e.g., the streaming of a movie). Alternatively, each of the flows may be associated with different end user sessions (e.g., the streaming of a movie and a video conference with a colleague).

In block 670, control information is reported to the controller. For example, wireless station 110 may continually monitor service performance metrics, link parameters, traffic flow characteristics, etc., and report the results of the monitoring (e.g., control information) to data center 155, as described herein.

Although FIGS. 6A and 6B illustrate an exemplary process 600 of the 5G fronthaul and backhaul connection services, according to other embodiments, process 600 may include additional operations, fewer operations, and/or different operations than those illustrated in FIGS. 6A and 6B and described herein.

Figure 7A:
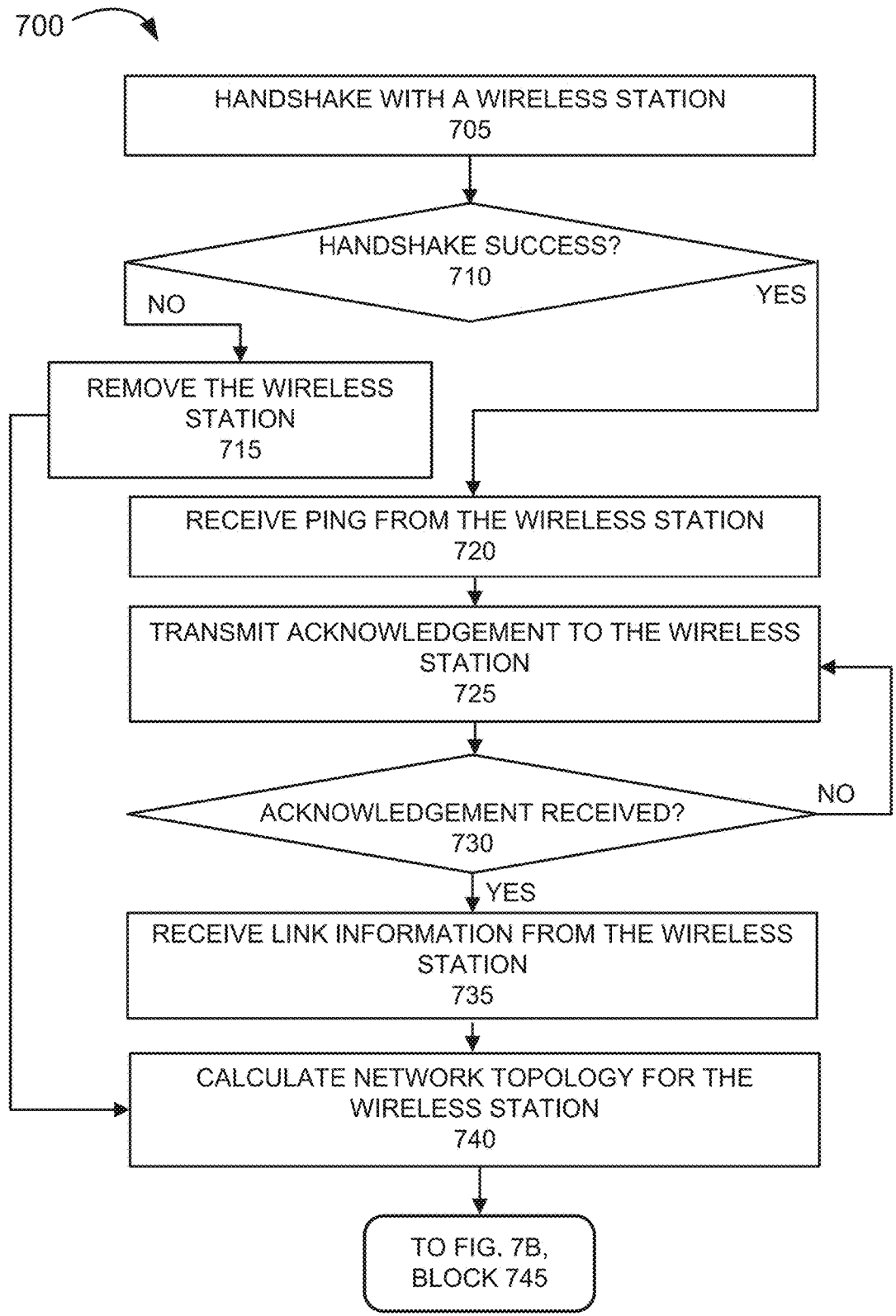
FIGS. 7A-7C are flow diagrams illustrating an exemplary process of a backhaul service.
Figure 7B:
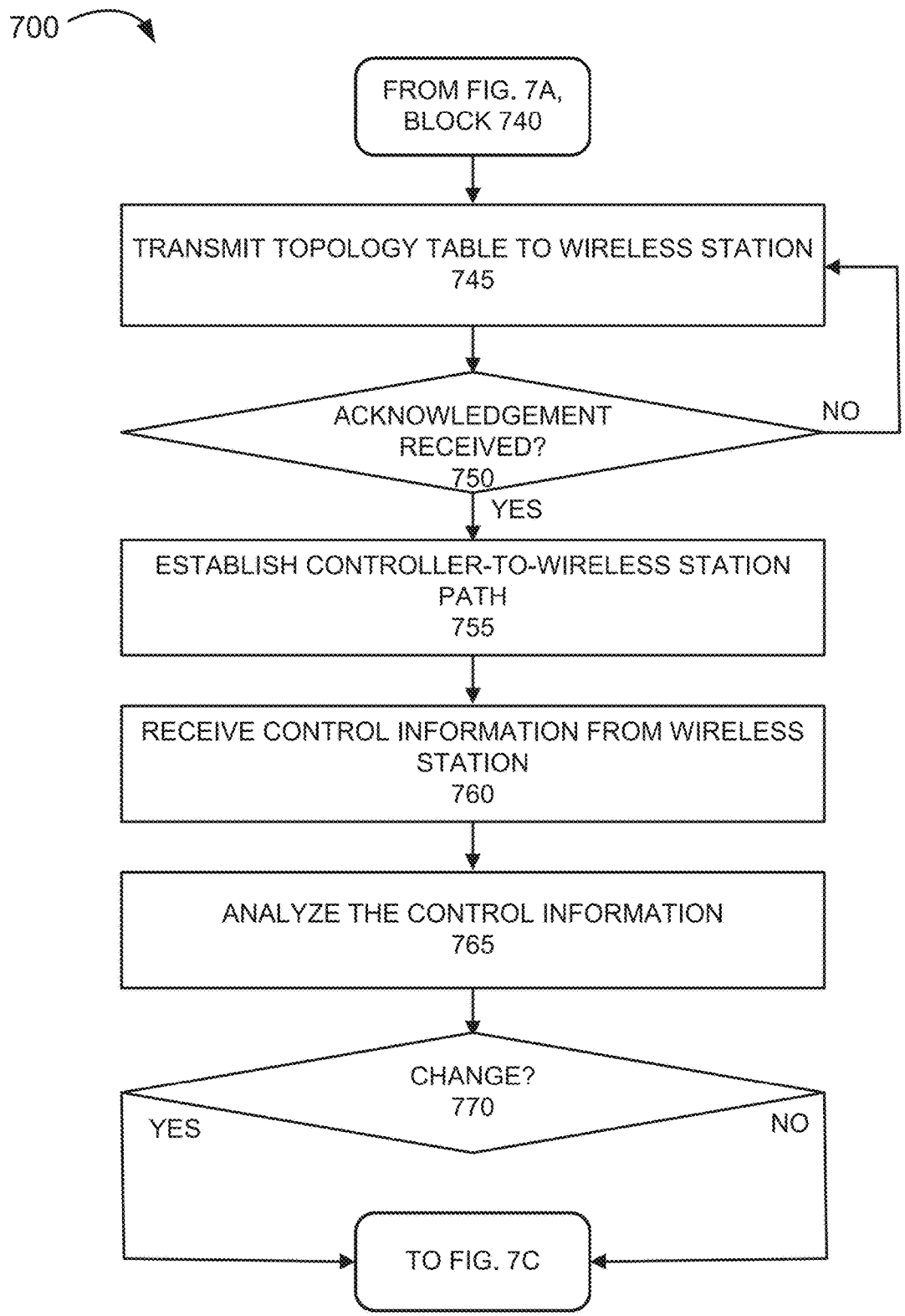
Figure 7C:
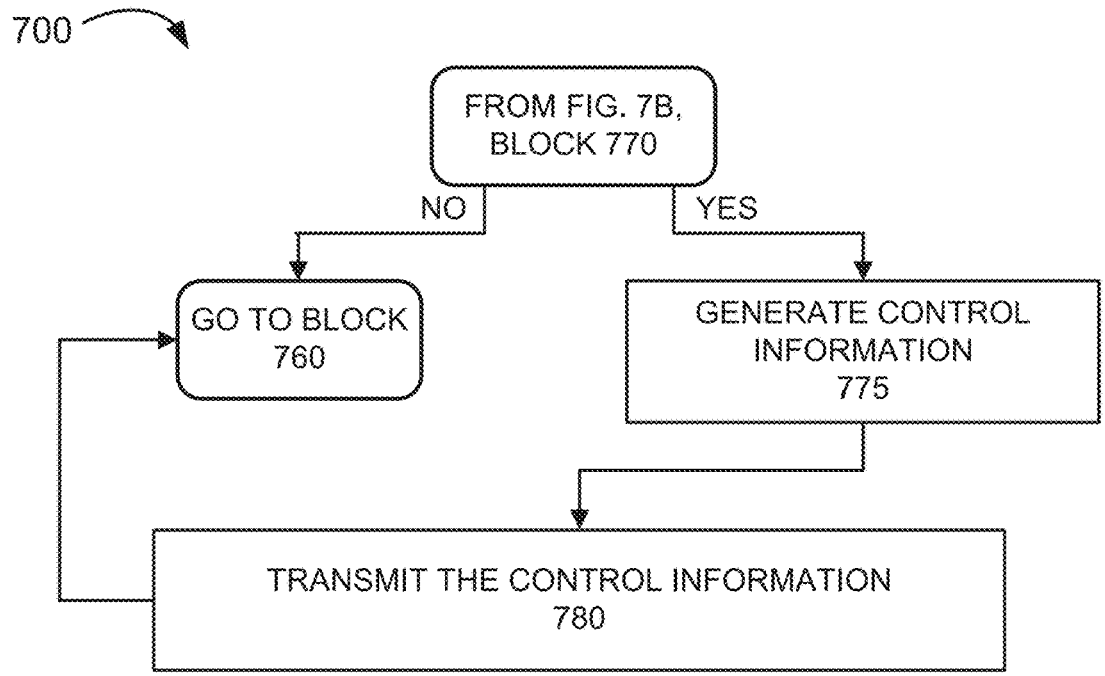

FIGS. 7A-7C are flow diagrams illustrating an exemplary process 700 pertaining to the 5G backhaul service. Process 700 is directed to a process previously described above with respect to FIG. 2B, as well as elsewhere in this description. According to an exemplary embodiment, data center 155 performs steps of process 700. For example, processor 410 executes software 420 to perform the steps illustrated in FIGS. 7A-7C and described herein.

Referring to FIG. 7A, block 705, a handshake with a wireless station is performed. For example, front end controller 250 of data center 155 may perform a handshake with wireless station 110 to establish an end-to-end connection. The end-to-end connection may be on the control plane. The handshake process may include front end controller 250 transmitting a message on the control plane to wireless station 110.

In block 710, it is determined whether the handshake is successful. For example, front end controller 250 may determine whether the handshake is successful based on the receipt of an acknowledgement from wireless station 110.

When it is determined that the handshake is not successful (block 710—NO), the wireless station may be removed (block 715) from the network topology information. For example, topology controller 252 of data center 155 may remove or deactivate (e.g., change its state) wireless station 110 from the network topology information. When it is determined that the handshake is successful (block 710—YES), a ping from a wireless station is received (block 720). For example, in relation to block 640 of process 600, data center 155 may receive the ping from wireless station 110 before the transmission of link information. In block 725, an acknowledgement is transmitted to the wireless station. For example, in response to receiving the ping, front end controller 250 transmits the acknowledgement on the control plane to wireless station 110.

In block 730, it is determined whether the transmitted acknowledgement is received. For example, according to an exemplary implementation in which a three-way handshake is implemented, data center 155 may determine whether the transmitted acknowledgement is received based on whether an acknowledgement is received from wireless station 110.

When it is determined that the transmitted acknowledgement is not received (block 730—NO), process 700 may continue to block 725. For example, front end controller 250 may retransmit the acknowledgement to wireless station 110. Front end controller 250 may use a back-off strategy before retransmitting an acknowledgement after a failed attempt. Additionally, or alternatively, for example, front end controller 250 may invoke an error process when a certain number of failed attempts occur.

When it is determined that the transmitted acknowledgement is received (block 730—YES), link information is received from the wireless station. For example, front end controller 250 may receive the link information on the control plane from wireless station 110.

In block 740, network topology information is calculated for the wireless station. For example, topology controller 252 calculates the network topology of intelligent wireless mesh network 105 based on the link information. Topology controller 252 may use other types of control information, control information from other elements, etc., to calculate the current network topology. Additionally, as previously described, topology controller 252 may use network analytics information to continually update the network topology.

Referring to FIG. 7B, in block 745, network topology information is transmitted to the wireless station. According to an exemplary implementation, front end controller 250 transmits network topology information on the control plane to wireless station 110. According to another exemplary implementation, front end controller 250 does not transmit network topology information to wireless station 110. For example, topology and routing controller 206 may manage its own local network topology table without receiving network topology information from data center 155.

In block 750, it is determined whether an acknowledgement is received. For example, front end controller 250 may determine whether an acknowledgement is received for the network topology information. When it is determined that the acknowledgement is not received (block 750—NO), process 700 may continue to block 745. For example, front end controller 250 may retransmit the network topology information to wireless station 110. Front end controller 250 may use a back-off strategy before retransmitting the network topology information after a failed attempt. Additionally, or alternatively, for example, front end controller 250 may invoke an error process when a certain number of failed attempts occur.

When it is determined that the acknowledgement is received (block 750—YES), a controller-to-wireless station path is established (block 755). For example, network flows controller 256 may establish a controller-to-wireless station path on the data plane with wireless station 110. In this way, data center 155 has an end-to-end connection with wireless station 110. Network flows controller 256 may establish multiple end-to-end connections via different paths to wireless station 110. The path may include a route, a VLAN, a virtual circuit, a tunnel, a pipe, a flow, and/or other communication segment within intelligent wireless mesh network 105 to be used to provide the fronthaul service.

In block 760, control information is received from a wireless station. For example, front end controller 250 receives control information on the control plane from wireless station 110. The control information may include, for example, link information, service performance information, traffic flow information, and/or network topology information. The control information may be made available to other elements of data center 155.

In block 765, the control information is analyzed. For example, network analytics 254 uses the control information to analyze the current state of intelligent wireless mesh network 105. According to an exemplary implementation, network analytics 254 may determine whether a path, routing, forwarding, etc., of a flow on the data plane should be changed. For example, network analytics 254 may determine whether a performance metric is being satisfied based on a comparison between a metric value (e.g., latency, etc.) included in the control information compared to a threshold metric value. Additionally, or alternatively, for example, network analytics 254 may identify a network state (e.g., congestion, onset of congestion, node failure, link failure, etc.).

According to an exemplary embodiment, network analytics 254 may be configured to manage the network resources based on an administrative parameter. The administrative parameter may be global parameter (e.g., for all users, for the entire network, etc.) or non-global parameter (e.g., individual, a group of users, type of traffic (e.g., real-time, non-real-time, type of application (e.g., web browser, etc.), portion of the network, etc.). For example, the administrative parameter may indicate a minimum and/or maximum number of activate paths allocated to an end user session, a metric (e.g., shortest path, a traffic and/or performance metric), and/or another type of variable pertaining to governance of traffic flows, network resource usage, etc.

In block 770, it is determined whether to change a configuration of the network. For example, network analytics 254 may determine whether control information is to be generated to provide the change in the configuration of the network. By way of example, network analytics 254 may determine whether to change a path currently used by wireless station 110. Referring to FIG. 7C, when it is determined that a change will not be made (block 770—NO), then process 700 may continue to block 760. For example, network analytics 254 may wait to receive another instance of control information from wireless station 110 (or another element of environment 100). In this way, network analytics 254 may use the control information to efficiently manage the network resources of the elements in environment 100 and provide quality of service to the end user.

When it is determined that a change will be made (block 770—YES), control information is generated (block 775). For example, network analytics 254 generates control information to effect the change. By way of further example, network analytics 254 may generate routing and forwarding information to be used by wireless station 110.

In block 780, the control information is transmitted. For example, in response to the generation of the control information, front end controller 250 transmits the control information on the control plane to wireless station 110 and/or other element of environment 100. Process 700 may continue to block 760.

According to an exemplary embodiment, the process of wireless station 110 providing control information to data center 155 and data center 155 analyzing and determining whether changes should be made or not is continually repeated. With reference to block 780 and wireless station 110, wireless station 110 receives the control information and configures itself according to the change. For example, wireless station 110 may modify one or more paths on the data plane, such as one or more paths to the controller, one or more paths to end device 160, or both. The path may be an active path (e.g., traffic flowing along the path) or not (e.g., an established path but no traffic flowing).

Although FIGS. 7A-7C illustrate an exemplary process 700 of the 5G backhaul service, according to other embodiments, process 700 may include additional operations, fewer operations, and/or different operations than those illustrated in FIGS. 7A-7C and described herein. For example, according to an exemplary embodiment, network analytics 254 includes logic that identifies a network state in which human intervention may be invoked. For example, network analytics 254 may store triggering event information that permits the identification of the network state. The network state may be a current state or a future state (e.g., predictive). According to an exemplary implementation, network analytics 254 notifies and/or alerts a network administrator or other type of user of the network state. Network analytics 254 includes logic that provides a user interface that permits the user to configure a portion or the entire network by selecting or inputting an administrative parameter or other network configuration information. According to another exemplary implementation, network analytics 254 includes logic that generates a recommendation to the user on how to manage the network state. The user may accept, deny, or change the recommendation. Network analytics 254 generates and transmits the control information based on the acceptance or alteration of the recommendation. Alternatively, when the user denies the recommendation, the user may configure control information so that the control information may be subsequently transmitted.

Figure 8A:
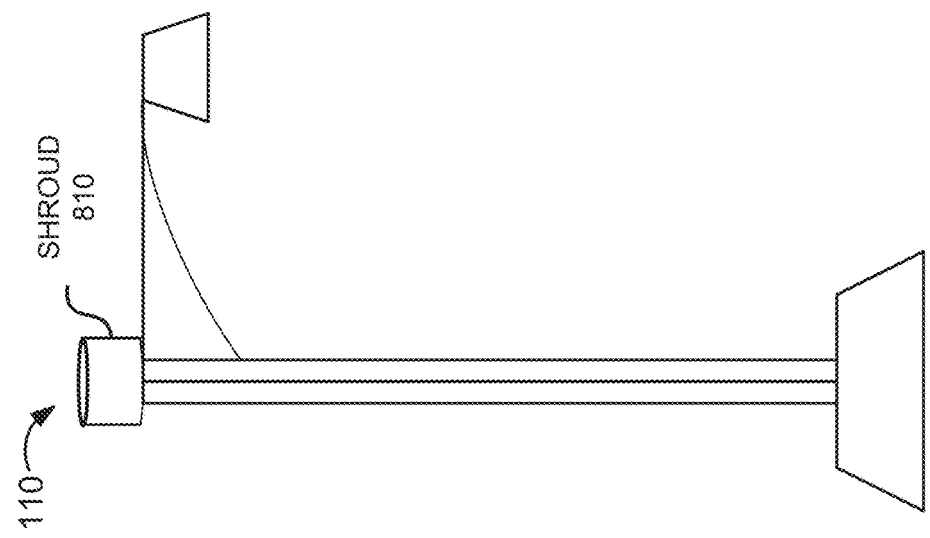
FIGS. 8A-8D are diagram illustrating exemplary configurations of a wireless station.
Figure 8B:
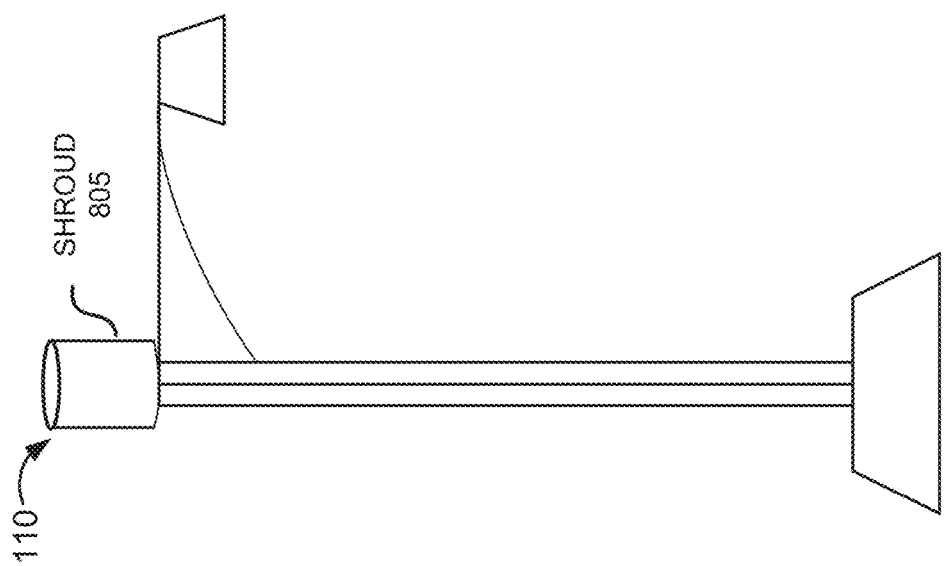

FIGS. 8A-8D are diagrams that illustrate exemplary configurations of a wireless station or a portion of a wireless station. For example, in FIG. 8A, wireless station 110 may include a shroud 805 to enclose the functional components. Shroud 805 may be implemented as street furniture, such as a lamp post, bench, building facade, bus stop, or another type of enclosure that can house a wireless interface for access communication (e.g., between wireless station 110 and end device 160), fronthaul communication (e.g., between wireless stations 110), and backhaul communication (e.g., between wireless station 110 and hub 150). Alternatively, for example, in FIG. 8B, wireless station 110 may include a shroud 810 as illustrated. Similarly, shroud 810 may be implemented as street furniture or another type of enclosure that can house a wireless interface for access communication and a wired interface (e.g., optical fiber, etc.) for fronthaul communication and/or backhaul communication. While wireless station 110 in FIGS. 8A and 8B are illustrated as mounted to a street lamp, wireless station 110 may be mounted to or affixed to other objects that are present in a particular locale. Alternatively, wireless station 110 may include its own free standing support system.

Figure 8D:
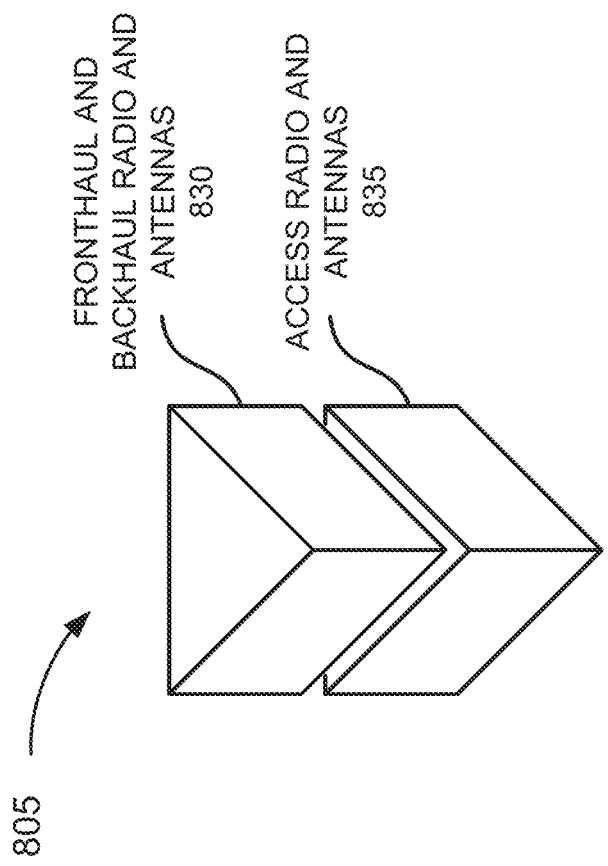
Figure 8C:
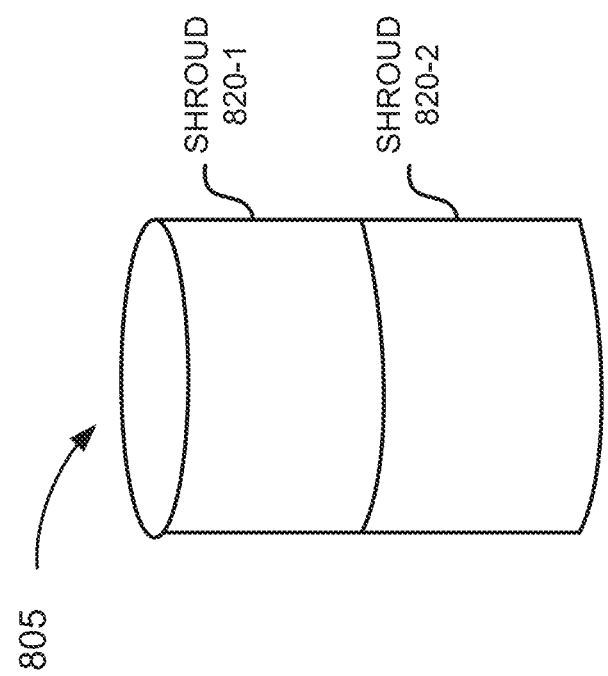

According to an exemplary embodiment, wireless station 110 is implemented as a modularized configuration or form factor in which the configuration or form factor is the same or substantially the same for access, fronthaul, and backhaul. The term "substantially" is used herein to represent a degree by which a quantitative representation may vary from a stated reference without resulting in a change in the basic function of the subject matter at issue. For example, in FIG. 8C, shroud 805 may include a shroud 820-1 and a shroud 820-2. Referring to FIG. 8D, shroud 820-1 may house fronthaul and backhaul radio and antennas 830 and shroud 820-2 may house access radio and antennas 835. The antennas for each shroud 820 may be tilted, as well as other parameters (e.g., power, frequency, etc.) configured to provide respective access, fronthaul, and backhaul services. The form factor for antennas 830 and 835 may be the same, as illustrated in FIG. 8D. According to other examples, the form factor may be different from one another. Additionally, the tri-sector antenna form of antennas 830 and 835 is merely exemplary. According to other exemplary implementations, the sector antenna forms between fronthaul/backhaul and access may be different (e.g., 180 degrees, 270 degrees, etc.), may be different from one another, etc. As illustrated in FIG. 9, wireless stations 110-1 to 110-6 may be dispersed in various locations and may have links 910-1 to 910-7 to provide the 5G fronthaul service and backhaul connection service. For wireless station 110 in FIG. 8A, wireless station 110 may include a wire or line for power. In contrast, for wireless station 110 in FIG. 8B, wireless station 110 may include the wire or line for power and another wire or line (e.g., cable, optical fiber, etc.) for fronthaul communication and/or backhaul communication.

The foregoing description of embodiments provides illustration, but is not intended to be exhaustive or to limit the embodiments to the precise form disclosed. In the preceding description, various embodiments have been described with reference to the accompanying drawings. However, various modifications and changes may be made thereto, and additional embodiments may be implemented, without departing from the broader scope of the invention as set forth in the claims that follow. The description and drawings are accordingly to be regarded as illustrative rather than restrictive.

In addition, while series of blocks have been described with regard to the processes illustrated in FIGS. 6A, 6B and 7A-7C, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic" or as a "component." The logic or the component may include, for example, hardware (e.g., processor 410, etc.), or a combination of hardware and software (e.g., software 420). The embodiments have been described without reference to the specific software code since the software code can be designed to implement the embodiments based on the description herein and commercially available software design environments/languages.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 410) of a computational device. A non-transitory storage medium includes one or more of the storage mediums described in relation to memory/storage 415.

No element, act, or instruction described in the present application should be construed as critical or essential to the embodiments described herein unless explicitly described as such.

What is claimed is:

1. A method comprising:
   establishing, by a controller device, a first link with a wireless station of a wireless access network, wherein the wireless access network is one of a next generation partial mesh network or a next generation full mesh network;
   receiving, by the controller device via the first link from the wireless station, current control information pertaining to one or multiple second links of a data plane for end user traffic that are between the wireless station and one or multiple wireless stations of the wireless access network, wherein the current control information includes one or more of link information that indicates whether the one or multiple second links are a line of sight link or not a line of sight link, service performance information that indicates one or more service performance metrics, or traffic flow information;
   analyzing, by the controller device, the current control information;
   determining, by the controller device in response to the analyzing, whether the one or multiple second links should be changed;
   changing, by the controller device, one or more of the one or multiple second links when determining that the one or multiple second links should be changed; and
   transmitting, by the controller device to the wireless station, routing and forwarding information that indicates the one or more of the one or multiple second links.

2. The method of claim 1, further comprising:
   calculating, by the controller device, network topology information for the wireless station based on the link information.

3. The method of claim 1, further comprising:
   transmitting, by the controller device via the first link, network topology information to the wireless station.

4. The method of claim 1, further comprising:
   establishing, by the controller device, an end-to-end connection with the wireless station on a data plane for the end user traffic, wherein the first link is on a control plane.

5. The method of claim 1, wherein the one or more service performance metrics include one or more of throughput, latency, packet loss, error rate, or link utilization.

6. The method of claim 1, wherein the determining further comprises:
   determining, by the controller device, whether the one or multiple second links should be changed based on at least one of a minimum number of active paths to be allocated to an end user session or a maximum number of active paths to be allocated to the end user session.

7. The method of claim 1, wherein the determining further comprises:
   determining, by the controller device, whether the one or multiple second links should be changed based on one or more service performance metric requirements pertaining to an end user session.

8. The method of claim 1, wherein the link information includes a link budget, and wherein the next generation partial mesh network includes a fifth generation (5G) partial mesh network and the next generation full mesh network includes a fifth generation (5G) full mesh network.

9. A network device comprising:
a communication interface;
a memory, wherein the memory stores instructions; and
a processor, wherein the processor executes the instructions to:
establish, via the communication interface, a first link with a wireless station of a wireless access network, wherein the wireless access network is one of a next generation partial mesh network or a next generation full mesh network;
receive, via the communication interface from the wireless station, current control information pertaining to one or multiple second links of a data plane for end user traffic that are between the wireless station and one or multiple wireless stations of the wireless access network, wherein the current control information includes one or more of link information that indicates whether the one or multiple second links are a line of sight link or not a line of sight link, service performance information that indicates one or more service performance metrics, or traffic flow information;
analyze the current control information;
determine, in response to the analysis, whether the one or multiple second links should be changed;
change one or more of the one or multiple second links when determining that the one or multiple second links should be changed; and
transmit, via the communication interface to the wireless station, routing and forwarding information that indicates the one or more of the one or multiple second links.

10. The network device of claim 9, wherein the processor further executes the instructions to:
calculate network topology information for the wireless station based on the link information.

11. The network device of claim 9, wherein the processor further executes the instructions to:
transmit, via the communication interface to the wireless station, network topology information.

12. The network device of claim 9, wherein the processor further executes the instructions to:
establish, via the communication interface, an end-to-end connection with the wireless station on a data plane for the end user traffic, wherein the first link is on a control plane.

13. The network device of claim 9, wherein the one or more service performance metrics include one or more of throughput, latency, packet loss, error rate, or link utilization.

14. The network device of claim 9, wherein, when determining, the processor further executes the instructions to:
determine whether the one or multiple second links should be changed based on at least one of a minimum number of active paths to be allocated to an end user session or a maximum number of active paths to be allocated to the end user session.

15. The network device of claim 9, wherein, when determining, the processor further executes the instructions to:

determine whether the one or multiple second links should be changed based on one or more service performance metric requirements pertaining to an end user session.

16. A non-transitory computer-readable storage medium storing instructions executable by a processor of a device, which when executed cause the device to:
establish a first link with a wireless station of a wireless access network, wherein the wireless access network is one of a next generation partial mesh network or a next generation full mesh network;
receive, via the first link from the wireless station, current control information pertaining to one or multiple second links of a data plane for end user traffic that are between the wireless station and one or multiple wireless stations of the wireless access network, wherein the current control information includes one or more of link information that indicates whether the one or multiple second links are a line of sight link or not a line of sight link, service performance information that indicates one or more service performance metrics, or traffic flow information;
analyze the current control information;
determine, based on the analysis, whether the one or multiple second links should be changed;
change one or more of the one or multiple second links when determining that the one or multiple second links should be changed; and
transmit, to the wireless station, routing and forwarding information that indicates the one or more of the one or multiple second links.

17. The non-transitory computer-readable storage medium of claim 16, wherein the instructions further comprise instructions executable by the processor of the device, which when executed cause the device to:
calculate network topology information for the wireless station based on the link information.

18. The non-transitory computer-readable storage medium of claim 16, wherein the instructions to determine further comprise instructions executable by the processor of the device, which when executed cause the device to:
determine whether the one or multiple second links should be changed based on one or more service performance metric requirements pertaining to an end user session.

19. The non-transitory computer-readable storage medium of claim 16, wherein the instructions to determine further comprise instructions executable by the processor of the device, which when executed cause the device to:
determine whether the one or multiple second links should be changed based on at least one of a minimum number of active paths to be allocated to an end user session or a maximum number of active paths to be allocated to the end user session.

20. The non-transitory computer-readable storage medium of claim 16, wherein the link information includes a link budget, and wherein the next generation partial mesh network includes a fifth generation (5G) partial mesh network and the next generation full mesh network includes a fifth generation (5G) full mesh network.

* * * * *